(12) United States Patent
Gupta et al.

(10) Patent No.: US 11,261,725 B2
(45) Date of Patent: Mar. 1, 2022

(54) SYSTEMS AND METHODS FOR ESTIMATING AND CONTROLLING LIQUID LEVEL USING PERIODIC SHUT-INS

(71) Applicants: Robin Gupta, Spring, TX (US); Neal L. Adair, Spring, TX (US); Sriram Doraiswamy, Spring, TX (US); Ted A. Long, Spring, TX (US)

(72) Inventors: Robin Gupta, Spring, TX (US); Neal L. Adair, Spring, TX (US); Sriram Doraiswamy, Spring, TX (US); Ted A. Long, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 507 days.

(21) Appl. No.: 16/165,280

(22) Filed: Oct. 19, 2018

(65) Prior Publication Data
US 2019/0120043 A1    Apr. 25, 2019

(51) Int. Cl.
*E21B 47/047* (2012.01)
*E21B 43/24* (2006.01)
(Continued)

(52) U.S. Cl.
CPC .......... *E21B 47/047* (2020.05); *E21B 43/122* (2013.01); *E21B 43/14* (2013.01);
(Continued)

(58) Field of Classification Search
CPC .... E21B 47/047; E21B 47/003; E21B 47/107; E21B 43/122; E21B 43/14; E21B 47/06;
(Continued)

(56) References Cited

U.S. PATENT DOCUMENTS

| | | | |
|---|---|---|---|
| 1,422,204 | A | 7/1922 | Hoover et al. |
| 1,491,138 | A | 4/1924 | Hixon |

(Continued)

FOREIGN PATENT DOCUMENTS

| | | | |
|---|---|---|---|
| CA | 0603924 A | 8/1960 | |
| CA | 0836325 A | 3/1970 | |

(Continued)

OTHER PUBLICATIONS

Al-Gosayier, M., et al. (2015) "In Situ Recovery Of Heavy-Oil From Fractured Carbonate Reservoirs: Optimization Of Steam-Over-Solvent Injection Method" *Journal of Petroleum Science and Engineering*, vol. 130, pp. 77-85.

(Continued)

*Primary Examiner* — Alexander Satanovsky
(74) *Attorney, Agent, or Firm* — ExxonMobil Upstream Research Company—Law Department

(57) ABSTRACT

Methods and systems for determining a liquid level in a formation between a horizontal segment of an injection wellbore and a horizontal segment of a production wellbore are disclosed. Under shut-in conditions, local temperatures and pressures are determined for each of a plurality of inflow zones along the production wellbore segment. Local profile values are determined based on local shut-in subcool values and local shut-in liquid levels. After flow has resumed, a local liquid level is determined based on the local operating subcool value and the local profile value for that inflow zone. The local profile values may be updated during subsequent shut-ins.

28 Claims, 12 Drawing Sheets

(51) Int. Cl.

| | | |
|---|---|---|
| *E21B 47/003* | (2012.01) | |
| *E21B 47/07* | (2012.01) | |
| *E21B 47/107* | (2012.01) | |
| *E21B 43/12* | (2006.01) | |
| *E21B 43/14* | (2006.01) | |
| *E21B 47/06* | (2012.01) | |
| *E21B 49/08* | (2006.01) | |
| *G01F 1/66* | (2006.01) | |
| *G01F 23/296* | (2006.01) | |
| *G01V 1/40* | (2006.01) | |
| *G01V 9/02* | (2006.01) | |

(52) U.S. Cl.
CPC ........ *E21B 43/2406* (2013.01); *E21B 47/003* (2020.05); *E21B 47/06* (2013.01); *E21B 47/07* (2020.05); *E21B 47/107* (2020.05); *E21B 49/08* (2013.01); *G01F 1/662* (2013.01); *G01F 23/296* (2013.01); *G01V 1/40* (2013.01); *G01V 9/02* (2013.01); *E21B 43/121* (2013.01)

(58) Field of Classification Search
CPC .... E21B 49/08; E21B 43/2406; E21B 43/121; G01F 1/662; G01F 23/296; G01V 1/40; G01V 9/02
See application file for complete search history.

(56) References Cited

U.S. PATENT DOCUMENTS

| | | |
|---|---|---|
| 2,365,591 A | 12/1944 | Ranney |
| 2,412,765 A | 12/1946 | Buddrus |
| 2,813,583 A | 11/1957 | Marx et al. |
| 2,859,818 A | 11/1958 | Hall et al. |
| 2,862,558 A | 12/1958 | Dixon |
| 2,910,123 A | 1/1959 | Elkins et al. |
| 2,876,838 A | 3/1959 | Williams |
| 2,881,838 A | 4/1959 | Morse et al. |
| 2,909,224 A | 10/1959 | Allen |
| 3,126,961 A | 3/1964 | Craig, Jr. et al. |
| 3,156,299 A | 11/1964 | Trantham |
| 3,163,215 A | 12/1964 | Stratton |
| 3,174,544 A | 3/1965 | Campion et al. |
| 3,182,722 A | 5/1965 | Reed |
| 3,205,944 A | 9/1965 | Walton |
| 3,221,809 A | 12/1965 | Walton |
| 3,232,345 A | 2/1966 | Trantham et al. |
| 3,237,689 A | 3/1966 | Justheim |
| 3,246,693 A | 4/1966 | Crider |
| 3,280,909 A | 10/1966 | Closmann et al. |
| 3,294,167 A | 12/1966 | Vogel |
| 3,310,109 A | 3/1967 | Marx et al. |
| 3,314,476 A | 4/1967 | Staples et al. |
| 3,315,745 A | 4/1967 | Rees, Jr. |
| 3,322,194 A | 5/1967 | Strubbar |
| 3,332,482 A | 7/1967 | Trantham |
| 3,333,632 A | 8/1967 | Kyte |
| 3,334,687 A | 8/1967 | Parker |
| 3,342,257 A | 9/1967 | Jacobs et al. |
| 3,342,259 A | 9/1967 | Powell |
| 3,347,313 A | 10/1967 | Matthews et al. |
| 3,349,845 A | 10/1967 | Holbert et al. |
| 3,351,132 A | 11/1967 | Dougan et al. |
| 3,361,201 A | 1/1968 | Howard |
| 3,363,686 A | 1/1968 | Gilchrist |
| 3,363,687 A | 1/1968 | Dean |
| 3,373,804 A | 3/1968 | Glass et al. |
| 3,379,246 A | 4/1968 | Skylar et al. |
| 3,379,248 A | 4/1968 | Strange |
| 3,406,755 A | 10/1968 | Sharp |
| 3,411,578 A | 11/1968 | Holmes |
| 3,412,793 A | 11/1968 | Needham |
| 3,412,794 A | 11/1968 | Craighead |
| 3,422,891 A | 1/1969 | Alexander et al. |
| 3,430,700 A | 3/1969 | Satter et al. |
| 3,441,083 A | 4/1969 | Fitzgerald |
| 3,454,095 A | 7/1969 | Messenger et al. |
| 3,454,958 A | 7/1969 | Parker |
| 3,456,721 A | 7/1969 | Smith |
| 3,490,529 A | 1/1970 | Parker |
| 3,490,531 A | 1/1970 | Dixon |
| 3,507,330 A | 4/1970 | Gill |
| 3,547,192 A | 12/1970 | Claridge et al. |
| 3,554,285 A | 1/1971 | Meldau |
| 3,572,436 A | 3/1971 | Riehl |
| 3,605,888 A | 9/1971 | Crowson et al. |
| 3,608,638 A | 9/1971 | Terwiltiger |
| 3,653,438 A | 4/1972 | Wagner |
| 3,685,581 A | 8/1972 | Hess et al. |
| 3,690,376 A | 9/1972 | Zwicky et al. |
| 3,703,927 A | 11/1972 | Harry |
| 3,705,625 A | 12/1972 | Whitten et al. |
| 3,724,043 A | 4/1973 | Eustance |
| 3,727,686 A | 4/1973 | Prates et al. |
| 3,759,328 A | 9/1973 | Ueber et al. |
| 3,768,559 A | 10/1973 | Allen et al. |
| 3,771,598 A | 11/1973 | McBean |
| 3,782,465 A | 1/1974 | Bell et al. |
| 3,782,472 A | 1/1974 | Siess, Jr. |
| 3,796,262 A | 3/1974 | Allen et al. |
| 3,804,169 A | 4/1974 | Closmann |
| 3,805,885 A | 4/1974 | Van Huisen |
| 3,822,747 A | 7/1974 | Maguire, Jr. |
| 3,822,748 A | 7/1974 | Allen et al. |
| 3,823,777 A | 7/1974 | Allen et al. |
| 3,827,495 A | 8/1974 | Reed |
| 3,837,399 A | 9/1974 | Allen et al. |
| 3,837,402 A | 9/1974 | Stringer |
| 3,838,738 A | 10/1974 | Redford et al. |
| 3,847,219 A | 11/1974 | Wang et al. |
| 3,847,224 A | 11/1974 | Allen et al. |
| 3,872,924 A | 3/1975 | Clampitt |
| 3,881,550 A | 5/1975 | Barry |
| 3,882,941 A | 5/1975 | Pelofsky |
| 3,892,270 A | 7/1975 | Lindquist |
| 3,905,422 A | 9/1975 | Woodward |
| 3,913,671 A | 10/1975 | Redford et al. |
| 3,929,190 A | 12/1975 | Chang et al. |
| 3,931,856 A | 1/1976 | Barnes |
| 3,941,192 A | 3/1976 | Carlin et al. |
| 3,945,436 A | 3/1976 | Barry |
| 3,945,679 A | 3/1976 | Clossmann et al. |
| 3,946,809 A | 3/1976 | Hagedorn |
| 3,946,810 A | 3/1976 | Barry |
| 3,954,139 A | 5/1976 | Allen |
| 3,954,141 A | 5/1976 | Allen et al. |
| 3,958,636 A | 5/1976 | Perkins |
| 3,964,546 A | 6/1976 | Allen |
| 3,964,547 A | 6/1976 | Hujsak et al. |
| 3,967,853 A | 7/1976 | Closmann et al. |
| 3,978,920 A | 9/1976 | Bandyopadhyay et al. |
| 3,983,939 A | 10/1976 | Brown et al. |
| 3,993,133 A | 11/1976 | Clampitt |
| 3,994,341 A | 11/1976 | Anderson et al. |
| 3,997,004 A | 12/1976 | Wu |
| 3,999,606 A | 12/1976 | Bandyopadhyay et al. |
| 4,003,432 A | 1/1977 | Paull et al. |
| 4,004,636 A | 1/1977 | Brown et al. |
| 4,007,785 A | 2/1977 | Allen et al. |
| 4,007,791 A | 2/1977 | Johnson |
| 4,008,764 A | 2/1977 | Allen |
| 4,008,765 A | 2/1977 | Anderson et al. |
| 4,019,575 A | 4/1977 | Pisio et al. |
| 4,019,578 A | 4/1977 | Terry et al. |
| 4,020,901 A | 5/1977 | Pisio et al. |
| 4,022,275 A | 5/1977 | Brandon |
| 4,022,277 A | 5/1977 | Routson |
| 4,022,279 A | 5/1977 | Driver |
| 4,022,280 A | 5/1977 | Stoddard et al. |
| 4,026,358 A | 5/1977 | Allen |
| 4,033,411 A | 7/1977 | Goins |
| 4,037,655 A | 7/1977 | Carpenter |

(56) References Cited

U.S. PATENT DOCUMENTS

| | | |
|---|---|---|
| 4,037,658 A | 7/1977 | Anderson |
| 4,049,053 A | 9/1977 | Fisher et al. |
| 4,066,127 A | 1/1978 | Harnsberger |
| 4,067,391 A | 1/1978 | Dewell |
| 4,068,715 A | 1/1978 | Wu |
| 4,068,717 A | 1/1978 | Needham |
| 4,078,608 A | 3/1978 | Allen et al. |
| 4,079,585 A | 3/1978 | Helleur |
| 4,084,637 A | 4/1978 | Todd |
| 4,085,799 A | 4/1978 | Bousaid et al. |
| 4,085,800 A | 4/1978 | Engle et al. |
| 4,085,803 A | 4/1978 | Butler |
| 4,088,188 A | 5/1978 | Widmyer |
| 4,099,564 A | 7/1978 | Hutchinson |
| 4,099,568 A | 7/1978 | Allen |
| 4,109,720 A | 8/1978 | Allen et al. |
| 4,114,687 A | 9/1978 | Payton |
| 4,114,691 A | 9/1978 | Payton |
| 4,116,275 A | 9/1978 | Butler et al. |
| 4,119,149 A | 10/1978 | Wu et al. |
| 4,120,357 A | 10/1978 | Anderson |
| 4,124,071 A | 11/1978 | Allen et al. |
| 4,124,074 A | 11/1978 | Allen et al. |
| 4,127,170 A | 11/1978 | Redford |
| 4,129,183 A | 12/1978 | Kalfoglou |
| 4,129,308 A | 12/1978 | Hutchinson |
| 4,130,163 A | 12/1978 | Bombardieri |
| 4,133,382 A | 1/1979 | Cram et al. |
| 4,133,384 A | 1/1979 | Allen et al. |
| 4,140,180 A | 2/1979 | Bridges et al. |
| 4,140,182 A | 2/1979 | Vriend |
| 4,141,415 A | 2/1979 | Wu et al. |
| 4,144,935 A | 3/1979 | Bridges et al. |
| RE30,019 E | 6/1979 | Lindquist |
| 4,160,479 A | 7/1979 | Richardson et al. |
| 4,160,481 A | 7/1979 | Turk et al. |
| 4,166,503 A | 9/1979 | Hall et al. |
| 4,174,752 A | 11/1979 | Slater et al. |
| 4,175,618 A | 11/1979 | Wu et al. |
| 4,191,252 A | 3/1980 | Buckley et al. |
| 4,202,168 A | 5/1980 | Acheson et al. |
| 4,202,169 A | 5/1980 | Acheson et al. |
| 4,207,945 A | 6/1980 | Hall et al. |
| 4,212,353 A | 7/1980 | Hall |
| 4,217,956 A | 8/1980 | Goss et al. |
| 4,223,728 A | 9/1980 | Pegg |
| 4,228,853 A | 10/1980 | Harvey et al. |
| 4,228,854 A | 10/1980 | Sacuta |
| 4,228,856 A | 10/1980 | Reale |
| 4,246,966 A | 1/1981 | Stoddard et al. |
| 4,248,302 A | 2/1981 | Churchman |
| 4,249,602 A | 2/1981 | Burton, III et al. |
| 4,250,964 A | 2/1981 | Jewell et al. |
| 4,252,194 A | 2/1981 | Felber et al. |
| 4,260,018 A | 4/1981 | Shum et al. |
| 4,262,745 A | 4/1981 | Stewart |
| 4,265,310 A | 5/1981 | Britton et al. |
| 4,270,609 A | 6/1981 | Choules |
| 4,271,905 A | 6/1981 | Redford et al. |
| 4,274,487 A | 6/1981 | Hollingsworth et al. |
| 4,280,559 A | 7/1981 | Best |
| 4,282,929 A | 8/1981 | Krajicek |
| 4,284,139 A | 8/1981 | Sweany |
| RE30,738 E | 9/1981 | Bridges et al. |
| 4,289,203 A | 9/1981 | Swanson |
| 4,295,980 A | 10/1981 | Motz |
| 4,296,814 A | 10/1981 | Stalder et al. |
| 4,300,634 A | 11/1981 | Clampitt |
| 4,303,126 A | 12/1981 | Blevins |
| 4,305,463 A | 12/1981 | Zakiewicz |
| 4,306,981 A | 12/1981 | Blair, Jr. |
| 4,319,632 A | 3/1982 | Marr, Jr. |
| 4,319,635 A | 3/1982 | Jones |
| 4,324,291 A | 4/1982 | Wong et al. |
| 4,325,432 A | 4/1982 | Henry |
| 4,326,968 A | 4/1982 | Blair, Jr. |
| 4,327,805 A | 5/1982 | Poston |
| 4,330,038 A | 5/1982 | Soukup et al. |
| 4,333,529 A | 6/1982 | McCorquodale |
| 4,344,483 A | 8/1982 | Fisher et al. |
| 4,344,485 A | 8/1982 | Butler |
| 4,344,486 A | 8/1982 | Parrish |
| 4,345,652 A | 8/1982 | Roque |
| 4,362,213 A | 12/1982 | Tabor |
| 4,372,385 A | 2/1983 | Rhoades et al. |
| 4,372,386 A | 2/1983 | Rhoades et al. |
| 4,379,489 A | 4/1983 | Rollmann |
| 4,379,592 A | 4/1983 | Vakhnin et al. |
| 4,380,265 A | 4/1983 | Mohaupt |
| 4,380,267 A | 4/1983 | Fox |
| 4,381,124 A | 4/1983 | Verty et al. |
| 4,382,469 A | 5/1983 | Bell et al. |
| 4,385,661 A | 5/1983 | Fox |
| 4,387,016 A | 6/1983 | Gagon |
| 4,389,320 A | 6/1983 | Clampitt |
| 4,390,062 A | 6/1983 | Fox |
| 4,390,067 A | 6/1983 | William |
| 4,392,530 A | 7/1983 | Odeh et al. |
| 4,393,937 A | 7/1983 | Dilgren et al. |
| 4,396,063 A | 8/1983 | Bey |
| 4,398,602 A | 8/1983 | Anderson |
| 4,398,692 A | 8/1983 | Macfie |
| 4,406,499 A | 9/1983 | Yildirim |
| 4,407,367 A | 10/1983 | Kydd |
| 4,410,216 A | 10/1983 | Allen |
| 4,411,618 A | 10/1983 | Donaldson et al. |
| 4,412,585 A | 11/1983 | Bouck |
| 4,415,034 A | 11/1983 | Bouck |
| 4,417,620 A | 11/1983 | Shafir |
| 4,418,752 A | 12/1983 | Boyer et al. |
| 4,423,779 A | 1/1984 | Livingston |
| 4,427,528 A | 1/1984 | Lindörfer et al. |
| 4,429,744 A | 2/1984 | Cook |
| 4,429,745 A | 2/1984 | Cook |
| 4,431,056 A | 2/1984 | Shu |
| 4,434,851 A | 3/1984 | Haynes, Jr. et al. |
| 4,441,555 A | 4/1984 | Shu |
| 4,444,257 A | 4/1984 | Stine |
| 4,444,261 A | 4/1984 | Islip |
| 4,445,573 A | 5/1984 | McCaleb |
| 4,448,251 A | 5/1984 | Stine |
| 4,450,909 A | 5/1984 | Sacuta |
| 4,450,911 A | 5/1984 | Seglin et al. |
| 4,450,913 A | 5/1984 | Allen et al. |
| 4,452,491 A | 6/1984 | Seglin et al. |
| 4,453,597 A | 6/1984 | Brown et al. |
| 4,456,065 A | 6/1984 | Heim et al. |
| 4,456,066 A | 6/1984 | Shu |
| 4,456,068 A | 6/1984 | Burrill, Jr. et al. |
| 4,458,756 A | 7/1984 | Clark |
| 4,458,759 A | 7/1984 | Isaacs et al. |
| 4,460,044 A | 7/1984 | Porter |
| 4,465,137 A | 8/1984 | Sustek, Jr. et al. |
| 4,466,485 A | 8/1984 | Shu |
| 4,469,177 A | 9/1984 | Venkatesan |
| 4,471,839 A | 9/1984 | Snavely et al. |
| 4,473,114 A | 9/1984 | Bell et al. |
| 4,475,592 A | 10/1984 | Pachovsky |
| 4,475,595 A | 10/1984 | Watkins et al. |
| 4,478,280 A | 10/1984 | Hopkins et al. |
| 4,478,705 A | 10/1984 | Ganguli |
| 4,480,689 A | 11/1984 | Wunderlich |
| 4,484,630 A | 11/1984 | Chung |
| 4,485,868 A | 12/1984 | Sresty et al. |
| 4,487,262 A | 12/1984 | Venkatesan et al. |
| 4,487,264 A | 12/1984 | Hyne et al. |
| 4,488,600 A | 12/1984 | Fan |
| 4,488,976 A | 12/1984 | Dilgren et al. |
| 4,491,180 A | 1/1985 | Brown et al. |
| 4,495,994 A | 1/1985 | Brown et al. |
| 4,498,537 A | 2/1985 | Cook |
| 4,498,542 A | 2/1985 | Eisenhawer et al. |
| 4,499,946 A | 2/1985 | Martin et al. |
| 4,501,325 A | 2/1985 | Frazier et al. |

(56) References Cited

U.S. PATENT DOCUMENTS

| | | |
|---|---|---|
| 4,501,326 A | 2/1985 | Edmunds |
| 4,501,445 A | 2/1985 | Gregoli |
| 4,503,910 A | 3/1985 | Shu |
| 4,503,911 A | 3/1985 | Harman et al. |
| 4,508,170 A | 4/1985 | Littman |
| 4,513,819 A | 4/1985 | Islip et al. |
| 4,515,215 A | 5/1985 | Hermes et al. |
| 4,516,636 A | 5/1985 | Doscher |
| 4,522,260 A | 6/1985 | Wolcott, Jr. |
| 4,522,263 A | 6/1985 | Hopkins et al. |
| 4,524,826 A | 6/1985 | Savage |
| 4,527,650 A | 7/1985 | Bartholet |
| 4,528,104 A | 7/1985 | House et al. |
| 4,530,401 A | 7/1985 | Hartman et al. |
| 4,532,993 A | 8/1985 | Dilgren et al. |
| 4,532,994 A | 8/1985 | Toma et al. |
| 4,535,845 A | 8/1985 | Brown et al. |
| 4,540,049 A | 9/1985 | Hawkins et al. |
| 4,540,050 A | 9/1985 | Huang et al. |
| 4,545,435 A | 10/1985 | Bridges et al. |
| 4,546,829 A | 10/1985 | Martin et al. |
| 4,550,779 A | 11/1985 | Zakiewicz |
| 4,556,107 A | 12/1985 | Duerksen et al. |
| 4,558,740 A | 12/1985 | Yellig, Jr. |
| 4,565,245 A | 1/1986 | Mims et al. |
| 4,565,249 A | 1/1986 | Pebdani et al. |
| 4,572,296 A | 2/1986 | Watkins |
| 4,574,884 A | 3/1986 | Schmidt |
| 4,574,886 A | 3/1986 | Hopkins et al. |
| 4,577,688 A | 3/1986 | Gassmann et al. |
| 4,579,176 A | 4/1986 | Davies et al. |
| 4,589,487 A | 5/1986 | Venkatesan et al. |
| 4,595,057 A | 6/1986 | Deming et al. |
| 4,597,441 A | 7/1986 | Ware et al. |
| 4,597,443 A | 7/1986 | Shu et al. |
| 4,598,770 A | 7/1986 | Shu et al. |
| 4,601,337 A | 7/1986 | Lau et al. |
| 4,601,338 A | 7/1986 | Prats et al. |
| 4,607,695 A | 8/1986 | Weber |
| 4,607,699 A | 8/1986 | Stephens |
| 4,607,700 A | 8/1986 | Duerksen et al. |
| 4,610,304 A | 9/1986 | Doscher |
| 4,612,989 A | 9/1986 | Rakach et al. |
| 4,612,990 A | 9/1986 | Shu |
| 4,615,391 A | 10/1986 | Garthoffner |
| 4,620,592 A | 11/1986 | Perkins |
| 4,620,593 A | 11/1986 | Haagensen |
| 4,635,720 A | 1/1987 | Chew |
| 4,637,461 A | 1/1987 | Hight |
| 4,637,466 A | 1/1987 | Hawkins et al. |
| 4,640,352 A | 2/1987 | Vanmeurs et al. |
| 4,640,359 A | 2/1987 | Livesey et al. |
| 4,641,710 A | 2/1987 | Klinger |
| 4,645,003 A | 2/1987 | Huang et al. |
| 4,645,004 A | 2/1987 | Bridges et al. |
| 4,646,824 A | 3/1987 | Huang et al. |
| 4,648,835 A | 3/1987 | Esienhawer et al. |
| 4,651,825 A | 3/1987 | Wilson |
| 4,651,826 A | 3/1987 | Holmes |
| 4,653,583 A | 3/1987 | Huang et al. |
| 4,662,438 A | 5/1987 | Taflove et al. |
| 4,662,440 A | 5/1987 | Harmon et al. |
| 4,662,441 A | 5/1987 | Huang et al. |
| 4,665,035 A | 5/1987 | Tunac |
| 4,665,989 A | 5/1987 | Wilson |
| 4,667,739 A | 5/1987 | Van Meurs et al. |
| 4,679,626 A | 7/1987 | Perkins |
| 4,682,652 A | 7/1987 | Huang et al. |
| 4,682,653 A | 7/1987 | Angstadt |
| 4,685,515 A | 8/1987 | Huang et al. |
| 4,687,058 A | 8/1987 | Casad et al. |
| 4,690,215 A | 9/1987 | Roberts et al. |
| 4,691,773 A | 9/1987 | Ward et al. |
| 4,694,907 A | 9/1987 | Stahl et al. |
| 4,696,311 A | 9/1987 | Muiis et al. |
| 4,697,642 A | 10/1987 | Vogel |
| 4,699,213 A | 10/1987 | Fleming |
| 4,700,779 A | 10/1987 | Huang et al. |
| 4,702,314 A | 10/1987 | Huang et al. |
| 4,702,317 A | 10/1987 | Shen |
| 4,705,108 A | 11/1987 | Little et al. |
| 4,706,751 A | 11/1987 | Gondouin |
| 4,707,230 A | 11/1987 | Ajami |
| 4,718,485 A | 1/1988 | Brown et al. |
| 4,718,489 A | 1/1988 | Hallam et al. |
| 4,727,489 A | 2/1988 | Frazier et al. |
| 4,727,937 A | 3/1988 | Shum et al. |
| 4,739,831 A | 4/1988 | Settlemeyer et al. |
| 4,753,293 A | 6/1988 | Bohn |
| 4,756,369 A | 7/1988 | Jennings, Jr. et al. |
| 4,757,833 A | 7/1988 | Danley |
| 4,759,571 A | 7/1988 | Stone et al. |
| 4,766,958 A | 8/1988 | Faecke |
| 4,769,161 A | 9/1988 | Angstadt |
| 4,775,450 A | 10/1988 | Ajami |
| 4,782,901 A | 11/1988 | Phelps et al. |
| 4,785,028 A | 11/1988 | Hoskin et al. |
| 4,785,883 A | 11/1988 | Hoskin et al. |
| 4,787,452 A | 11/1988 | Jennings, Jr. |
| 4,793,409 A | 12/1988 | Bridges et al. |
| 4,793,415 A | 12/1988 | Holmes et al. |
| 4,804,043 A | 2/1989 | Shu et al. |
| 4,809,780 A | 3/1989 | Shen |
| 4,813,483 A | 3/1989 | Ziegler |
| 4,817,711 A | 4/1989 | Jeambey |
| 4,817,714 A | 4/1989 | Jones |
| 4,818,370 A | 4/1989 | Gregoli et al. |
| 4,819,724 A | 4/1989 | Bou-Mikael |
| 4,828,030 A | 5/1989 | Jennings, Jr. |
| 4,828,031 A | 5/1989 | Davis |
| 4,828,032 A | 5/1989 | Telezke et al. |
| 4,834,174 A | 5/1989 | Vandevier |
| 4,834,179 A | 5/1989 | Kokolis et al. |
| 4,844,155 A | 7/1989 | Megyeri et al. |
| 4,846,275 A | 7/1989 | McKay |
| 4,850,429 A | 7/1989 | Mims et al. |
| 4,856,587 A | 8/1989 | Nielson |
| 4,856,856 A | 8/1989 | Phelps et al. |
| 4,860,827 A | 8/1989 | Lee et al. |
| 4,861,263 A | 8/1989 | Schirmer |
| 4,867,238 A | 9/1989 | Bayless et al. |
| 4,869,830 A | 9/1989 | Konak et al. |
| 4,874,043 A | 10/1989 | Joseph et al. |
| 4,877,542 A | 10/1989 | Lon et al. |
| 4,884,155 A | 11/1989 | Spash |
| 4,884,635 A | 12/1989 | McKay et al. |
| 4,886,118 A | 12/1989 | Van Meurs et al. |
| 4,892,146 A | 1/1990 | Shen |
| 4,895,085 A | 1/1990 | Chips |
| 4,895,206 A | 1/1990 | Price |
| 4,896,725 A | 1/1990 | Parker et al. |
| 4,901,795 A | 2/1990 | Phelps et al. |
| 4,903,766 A | 2/1990 | Shu |
| 4,903,768 A | 2/1990 | Shu |
| 4,903,770 A | 2/1990 | Friedeman et al. |
| 4,915,170 A | 4/1990 | Hoskin |
| 4,919,206 A | 4/1990 | Freeman et al. |
| 4,926,941 A | 5/1990 | Glandt et al. |
| 4,926,943 A | 5/1990 | Hoskin |
| 4,928,766 A | 5/1990 | Hoskin |
| 4,930,454 A | 6/1990 | Latty et al. |
| 4,940,091 A | 7/1990 | Shu et al. |
| 4,945,984 A | 8/1990 | Price |
| 4,947,933 A | 8/1990 | Jones et al. |
| 4,961,467 A | 10/1990 | Pebdani |
| 4,962,814 A | 10/1990 | Alameddine |
| 4,964,461 A | 10/1990 | Shu |
| 4,966,235 A | 10/1990 | Gregoli et al. |
| 4,969,520 A | 11/1990 | Jan et al. |
| 4,974,677 A | 12/1990 | Shu |
| 4,982,786 A | 1/1991 | Jennings, Jr. |
| 4,983,364 A | 1/1991 | Buck et al. |
| 4,991,652 A | 2/1991 | Hoskin et al. |
| 5,010,953 A | 4/1991 | Friedman et al. |

(56) References Cited

U.S. PATENT DOCUMENTS

| | | |
|---|---|---|
| 5,013,462 A | 5/1991 | Danley |
| 5,014,787 A | 5/1991 | Duerksen |
| 5,016,709 A | 5/1991 | Combe et al. |
| 5,016,710 A | 5/1991 | Renard et al. |
| 5,016,713 A | 5/1991 | Sanchez et al. |
| 5,024,275 A | 6/1991 | Anderson et al. |
| 5,025,863 A | 6/1991 | Haines |
| 5,027,898 A | 7/1991 | Naae |
| 5,036,915 A | 8/1991 | Wyganowski |
| 5,036,917 A | 8/1991 | Jennings, Jr. et al. |
| 5,036,918 A | 8/1991 | Jennings, Jr. et al. |
| 5,040,605 A | 8/1991 | Showalter |
| 5,042,579 A | 8/1991 | Glandt et al. |
| 5,046,559 A | 9/1991 | Glandt |
| 5,046,560 A | 9/1991 | Teletzke et al. |
| 5,052,482 A | 10/1991 | Gondouin |
| 5,054,551 A | 10/1991 | Duerksen |
| 5,056,596 A | 10/1991 | McKay et al. |
| 5,058,681 A | 10/1991 | Reed |
| 5,060,726 A | 10/1991 | Glandt et al. |
| 5,065,819 A | 11/1991 | Kasevich |
| 5,083,612 A | 1/1992 | Ashrawi |
| 5,083,613 A | 1/1992 | Gregoli et al. |
| 5,085,275 A | 2/1992 | Gondouin |
| 5,095,984 A | 3/1992 | Irani |
| 5,099,918 A | 3/1992 | Bridges et al. |
| 5,101,898 A | 4/1992 | Hong |
| 5,105,880 A | 4/1992 | Shen |
| 5,109,927 A | 5/1992 | Supernaw et al. |
| 5,123,485 A | 6/1992 | Vasicek et al. |
| 5,131,471 A | 7/1992 | Duerksen et al. |
| 5,145,002 A | 9/1992 | McKay |
| 5,145,003 A | 9/1992 | Duerksen |
| 5,148,869 A | 9/1992 | Sanchez |
| 5,152,341 A | 10/1992 | Kasevich et al. |
| 5,156,214 A | 10/1992 | Hoskin et al. |
| 5,167,280 A | 12/1992 | Sanchez et al. |
| 5,172,763 A | 12/1992 | Mohammadi et al. |
| 5,174,377 A | 12/1992 | Kumar |
| 5,178,217 A | 1/1993 | Mohammadi et al. |
| 5,186,256 A | 2/1993 | Downs |
| 5,197,541 A | 3/1993 | Hess et al. |
| 5,199,488 A | 4/1993 | Kasevich et al. |
| 5,199,490 A | 4/1993 | Surles et al. |
| 5,201,815 A | 4/1993 | Hong et al. |
| 5,215,146 A | 6/1993 | Sanchez |
| 5,215,149 A | 6/1993 | Lu |
| 5,236,039 A | 8/1993 | Edelstein et al. |
| 5,238,066 A | 8/1993 | Beattie et al. |
| 5,246,071 A | 9/1993 | Chu |
| 5,247,993 A | 9/1993 | Sarem et al. |
| 5,252,226 A | 10/1993 | Justice |
| 5,271,693 A | 12/1993 | Johnson et al. |
| 5,273,111 A | 12/1993 | Brannan et al. |
| 5,277,830 A | 1/1994 | Hoskin et al. |
| 5,279,367 A | 1/1994 | Osterloh |
| 5,282,508 A | 2/1994 | Ellingsen et al. |
| 5,289,881 A | 3/1994 | Schuh |
| 5,293,936 A | 3/1994 | Bridges |
| 5,295,540 A | 3/1994 | Djabbarah et al. |
| 5,297,627 A | 3/1994 | Sanchez et al. |
| 5,305,829 A | 4/1994 | Kumar |
| 5,318,124 A | 6/1994 | Ong et al. |
| 5,325,918 A | 7/1994 | Berryman et al. |
| 5,339,897 A | 8/1994 | Leaute |
| 5,339,898 A | 8/1994 | Yu et al. |
| 5,339,904 A | 8/1994 | Jennings, Jr. et al. |
| 5,350,014 A | 9/1994 | McKay |
| 5,358,054 A | 10/1994 | Bert |
| 5,361,845 A | 11/1994 | Jamaluddin et al. |
| 5,377,757 A | 1/1995 | Ng |
| 5,404,950 A | 4/1995 | Ng et al. |
| 5,407,009 A | 4/1995 | Butler et al. |
| 5,411,086 A | 5/1995 | Burcham et al. |
| 5,411,089 A | 5/1995 | Vinegar et al. |
| 5,411,094 A | 5/1995 | Northrop |
| 5,413,175 A | 5/1995 | Edmunds |
| 5,414,231 A | 5/1995 | Sato et al. |
| 5,417,283 A | 5/1995 | Ejiogu et al. |
| 5,431,224 A | 7/1995 | Laali |
| 5,433,271 A | 7/1995 | Vinegar et al. |
| 5,449,038 A | 9/1995 | Horton et al. |
| 5,450,902 A | 9/1995 | Mathews |
| 5,456,315 A | 10/1995 | Kinsman et al. |
| 5,458,193 A | 10/1995 | Horton et al. |
| 5,483,801 A | 1/1996 | Craze |
| 5,503,226 A | 4/1996 | Wadleigh |
| 5,511,616 A | 4/1996 | Bert |
| 5,513,705 A | 5/1996 | Djabbarah et al. |
| 5,531,272 A | 7/1996 | Ng et al. |
| 5,534,186 A | 7/1996 | Walker et al. |
| 5,542,474 A | 8/1996 | Djabbarah et al. |
| 5,547,022 A | 8/1996 | Juprasert et al. |
| 5,553,974 A | 9/1996 | Nazarian |
| 5,560,737 A | 10/1996 | Schuring et al. |
| 5,565,139 A | 10/1996 | Walker et al. |
| 5,589,775 A | 12/1996 | Kuckes |
| 5,607,016 A | 3/1997 | Butler |
| 5,607,018 A | 3/1997 | Schuh |
| 5,626,191 A | 5/1997 | Greaves et al. |
| 5,626,193 A | 5/1997 | Nzekwu et al. |
| 5,635,139 A | 6/1997 | Holst et al. |
| 5,646,309 A | 7/1997 | Hammarberg et al. |
| 5,650,128 A | 7/1997 | Holst et al. |
| 5,660,500 A | 8/1997 | Marsden, Jr. et al. |
| 5,674,816 A | 10/1997 | Loree |
| 5,677,267 A | 10/1997 | Suarez et al. |
| 5,682,613 A | 11/1997 | Dinatale |
| 5,685,371 A | 11/1997 | Richardson et al. |
| 5,691,906 A | 11/1997 | Togashi et al. |
| 5,709,505 A | 1/1998 | Williams et al. |
| 5,713,415 A | 2/1998 | Bridges |
| 5,720,350 A | 2/1998 | McGuire |
| 5,725,054 A | 3/1998 | Shayegi |
| 5,738,937 A | 4/1998 | Baychar |
| 5,765,964 A | 6/1998 | Calcote et al. |
| 5,771,973 A | 6/1998 | Jensen |
| 5,788,412 A | 8/1998 | Jatkar |
| RE35,891 E | 9/1998 | Jamaluddin et al. |
| 5,803,171 A | 9/1998 | McCaffery et al. |
| 5,803,178 A | 9/1998 | Cain |
| 5,813,799 A | 9/1998 | Calcote et al. |
| 5,823,631 A | 10/1998 | Herbolzheimer et al. |
| 5,826,656 A | 10/1998 | McGuire et al. |
| 5,860,475 A | 1/1999 | Ejiogu et al. |
| 5,899,274 A | 5/1999 | Frauenfeld et al. |
| 5,923,170 A | 7/1999 | Kuckes |
| 5,931,230 A | 8/1999 | Lesage et al. |
| 5,941,081 A | 8/1999 | Burgener |
| 5,957,202 A | 9/1999 | Huang |
| 5,984,010 A | 11/1999 | Elias et al. |
| 6,000,471 A | 12/1999 | Langset |
| 6,004,451 A | 12/1999 | Rock et al. |
| 6,012,520 A | 1/2000 | Yu et al. |
| 6,015,015 A | 1/2000 | Luft et al. |
| 6,016,867 A | 1/2000 | Gregoli et al. |
| 6,016,868 A | 1/2000 | Gregoli et al. |
| 6,026,914 A | 2/2000 | Adams et al. |
| 6,039,116 A | 3/2000 | Stevenson et al. |
| 6,039,121 A | 3/2000 | Kisman |
| 6,048,810 A | 4/2000 | Baychar |
| 6,050,335 A | 4/2000 | Parsons |
| 6,056,057 A | 5/2000 | Vinegar et al. |
| 6,102,122 A | 8/2000 | de Rouffignac |
| 6,109,358 A | 8/2000 | McPhee et al. |
| 6,148,911 A | 11/2000 | Gipson et al. |
| 6,158,510 A | 12/2000 | Bacon et al. |
| 6,158,513 A | 12/2000 | Nistor et al. |
| 6,167,966 B1 | 1/2001 | Ayasse et al. |
| 6,173,775 B1 | 1/2001 | Elias et al. |
| 6,186,232 B1 | 2/2001 | Isaccs et al. |
| 6,189,611 B1 | 2/2001 | Kasevich |
| 6,205,289 B1 | 3/2001 | Kobro |
| 6,230,814 B1 | 5/2001 | Nasr et al. |

(56) References Cited

U.S. PATENT DOCUMENTS

| | | |
|---|---|---|
| 6,244,341 B1 | 6/2001 | Miller |
| 6,257,334 B1 | 7/2001 | Cyr et al. |
| 6,263,965 B1 | 7/2001 | Schmidt et al. |
| 6,276,457 B1 | 8/2001 | Moffatt et al. |
| 6,285,014 B1 | 9/2001 | Beck et al. |
| 6,305,472 B2 | 10/2001 | Richardson et al. |
| 6,318,464 B1 | 11/2001 | Mokrys |
| 6,325,147 B1 | 12/2001 | Doerler et al. |
| 6,328,104 B1 | 12/2001 | Grace |
| 6,353,706 B1 | 3/2002 | Bridges |
| 6,357,526 B1 | 3/2002 | Abdel-Halim et al. |
| 6,405,799 B1 | 6/2002 | Vallejos et al. |
| 6,409,226 B1 | 6/2002 | Slack et al. |
| 6,412,557 B1 | 7/2002 | Ayasse et al. |
| 6,413,016 B1 | 7/2002 | Nelson et al. |
| 6,454,010 B1 | 9/2002 | Thomas et al. |
| 6,484,805 B1 | 11/2002 | Perkins et al. |
| 6,536,523 B1 | 3/2003 | Kresnyak et al. |
| 6,554,067 B1 | 4/2003 | Davies et al. |
| 6,561,274 B1 | 5/2003 | Hayes et al. |
| 6,581,684 B2 | 6/2003 | Wellington et al. |
| 6,588,500 B2 | 7/2003 | Lewis |
| 6,591,908 B2 | 7/2003 | Nasr |
| 6,607,036 B2 | 8/2003 | Ranson et al. |
| 6,631,761 B2 | 10/2003 | Yuan et al. |
| 6,662,872 B2 | 12/2003 | Gutek et al. |
| 6,666,666 B1 | 12/2003 | Gilbert et al. |
| 6,681,859 B2 | 1/2004 | Hill |
| 6,688,387 B1 | 2/2004 | Wellington et al. |
| 6,702,016 B2 | 3/2004 | de Rouffignac et al. |
| 6,708,759 B2 | 3/2004 | Leaute et al. |
| 6,712,136 B2 | 3/2004 | de Rouffignac et al. |
| 6,712,150 B1 | 3/2004 | Misselbrook et al. |
| 6,715,546 B2 | 4/2004 | Vinegar et al. |
| 6,715,547 B2 | 4/2004 | Vinegar et al. |
| 6,715,548 B2 | 4/2004 | Wellington et al. |
| 6,715,549 B2 | 4/2004 | Wellington et al. |
| 6,719,047 B2 | 4/2004 | Fowler et al. |
| 6,722,429 B2 | 4/2004 | de Rouffignac et al. |
| 6,722,431 B2 | 4/2004 | Karanikas et al. |
| 6,725,920 B2 | 4/2004 | Zhang et al. |
| 6,729,394 B1 | 5/2004 | Hassan et al. |
| 6,729,395 B2 | 5/2004 | Shahin, Jr. et al. |
| 6,729,397 B2 | 5/2004 | Zhang et al. |
| 6,729,401 B2 | 5/2004 | Vinegar et al. |
| 6,732,794 B2 | 5/2004 | Wellington et al. |
| 6,732,795 B2 | 5/2004 | de Rouffignac et al. |
| 6,732,796 B2 | 5/2004 | Vinegar et al. |
| 6,733,636 B1 | 5/2004 | Heins |
| 6,736,215 B2 | 5/2004 | Maher et al. |
| 6,736,222 B2 | 5/2004 | Kuckes et al. |
| 6,739,394 B2 | 5/2004 | Vinegar et al. |
| 6,742,588 B2 | 6/2004 | Wellington et al. |
| 6,742,593 B2 | 6/2004 | Vinegar et al. |
| 6,745,831 B2 | 6/2004 | de Rouffignac et al. |
| 6,745,832 B2 | 6/2004 | Wellington et al. |
| 6,745,837 B2 | 6/2004 | Wellington et al. |
| 6,755,246 B2 | 6/2004 | Chen et al. |
| 6,758,268 B2 | 7/2004 | Vinegar et al. |
| 6,769,486 B2 | 8/2004 | Lim et al. |
| 6,782,947 B2 | 8/2004 | de Rouffignac et al. |
| 6,789,625 B2 | 9/2004 | de Rouffignac et al. |
| 6,794,864 B2 | 9/2004 | Mirotchnik et al. |
| 6,805,195 B2 | 10/2004 | Vinegar et al. |
| 6,814,141 B2 | 11/2004 | Huh et al. |
| 6,877,556 B2 | 4/2005 | Wittie et al. |
| 6,883,607 B2 | 4/2005 | Nenniger et al. |
| 6,962,466 B2 | 11/2005 | Vinegar et al. |
| 7,013,970 B2 | 3/2006 | Collie et al. |
| 7,056,725 B1 | 6/2006 | Lu |
| 7,069,990 B1 | 7/2006 | Bilak |
| 7,272,973 B2 | 9/2007 | Craig |
| 7,294,156 B2 | 11/2007 | Chakrabarty |
| 7,322,409 B2 | 1/2008 | Wittie et al. |
| 7,363,973 B2 | 4/2008 | Nenniger et al. |
| 7,434,619 B2 | 10/2008 | Rossi et al. |
| 7,464,756 B2 | 12/2008 | Gates et al. |
| 7,527,096 B2 | 5/2009 | Chung et al. |
| 7,770,643 B2 | 8/2010 | Daussin |
| 7,918,269 B2 | 4/2011 | Cavender et al. |
| 7,975,763 B2 | 7/2011 | Banerjee et al. |
| 8,141,636 B2 | 3/2012 | Speirs et al. |
| 8,176,982 B2 | 5/2012 | Gil et al. |
| 8,215,392 B2 | 7/2012 | Rao |
| 8,256,511 B2 | 9/2012 | Boone et al. |
| 8,327,936 B2 | 12/2012 | Coskuner |
| 8,434,551 B2 | 5/2013 | Nenniger et al. |
| 8,455,405 B2 | 6/2013 | Chakrabarty |
| 8,474,531 B2 | 7/2013 | Nasr et al. |
| 8,528,642 B2 | 9/2013 | Boone |
| 8,596,357 B2 | 12/2013 | Nenniger |
| 8,602,098 B2 | 12/2013 | Kwan et al. |
| 8,616,278 B2 | 12/2013 | Boone et al. |
| 8,684,079 B2 | 4/2014 | Wattenbarger et al. |
| 8,752,623 B2 | 6/2014 | Sirota et al. |
| 8,770,289 B2 | 7/2014 | Boone |
| 8,776,900 B2 | 7/2014 | Nenniger et al. |
| 8,783,358 B2 | 7/2014 | Critsinelis et al. |
| 8,788,251 B2 | 7/2014 | Weng et al. |
| 8,844,639 B2 | 9/2014 | Gupta et al. |
| 8,857,512 B2 | 10/2014 | Nenniger et al. |
| 8,899,321 B2 | 12/2014 | Dawson et al. |
| 8,985,205 B2 | 3/2015 | Nenniger |
| 9,103,205 B2 | 8/2015 | Wright et al. |
| 9,115,577 B2 | 8/2015 | Alvestad et al. |
| 9,316,096 B2 | 4/2016 | Bang et al. |
| 9,341,049 B2 | 5/2016 | Hailey, Jr. et al. |
| 9,347,312 B2 | 5/2016 | Vincelette et al. |
| 9,359,868 B2 | 6/2016 | Scott |
| 9,394,769 B2 | 7/2016 | Nenniger |
| 9,488,040 B2 | 11/2016 | Chakrabarty et al. |
| 9,506,332 B2 | 11/2016 | Saeedfar |
| 9,644,467 B2 | 5/2017 | Chakrabarty |
| 9,739,123 B2 | 8/2017 | Wheeler et al. |
| 9,809,786 B2 | 11/2017 | Olson et al. |
| 9,845,669 B2 | 12/2017 | Miller et al. |
| 9,951,595 B2 | 4/2018 | Akinlade et al. |
| 9,970,282 B2 | 5/2018 | Khaled et al. |
| 9,970,283 B2 | 5/2018 | Khaled et al. |
| 10,000,998 B2 | 6/2018 | Chakrabarty et al. |
| 10,041,340 B2 | 8/2018 | Chakrabarty |
| 10,094,208 B2 | 10/2018 | Hoier et al. |
| 10,145,226 B2 | 12/2018 | Yee et al. |
| 2001/0009830 A1 | 7/2001 | Bachar |
| 2001/0017206 A1 | 8/2001 | Davidson et al. |
| 2001/0018975 A1 | 9/2001 | Richardson et al. |
| 2002/0029881 A1 | 3/2002 | de Rouffignac et al. |
| 2002/0033253 A1 | 3/2002 | de Rouffignac et al. |
| 2002/0038710 A1 | 4/2002 | Maher et al. |
| 2002/0040779 A1 | 4/2002 | Wellington et al. |
| 2002/0046838 A1 | 4/2002 | Karanikas et al. |
| 2002/0056551 A1 | 5/2002 | Wellington et al. |
| 2002/0104651 A1 | 8/2002 | McClung, III |
| 2002/0148608 A1 | 10/2002 | Shaw |
| 2002/0157831 A1 | 10/2002 | Kurlenya et al. |
| 2003/0000711 A1 | 1/2003 | Gutek et al. |
| 2003/0009297 A1 | 1/2003 | Mirotchnik et al. |
| 2006/0231455 A1 | 10/2006 | Olsvik et al. |
| 2008/0115945 A1 | 5/2008 | Lau et al. |
| 2008/0153717 A1 | 6/2008 | Pomerleau et al. |
| 2008/0173447 A1 | 7/2008 | Da Silva et al. |
| 2009/0288826 A1 | 11/2009 | Gray |
| 2010/0258308 A1 | 10/2010 | Speirs et al. |
| 2010/0276140 A1 | 11/2010 | Edmunds et al. |
| 2010/0276341 A1 | 11/2010 | Speirs et al. |
| 2010/0276983 A1 | 11/2010 | Dunn et al. |
| 2010/0282593 A1 | 11/2010 | Speirs et al. |
| 2011/0067882 A1* | 3/2011 | Yeriazarian ............ E21B 43/14 166/369 |
| 2011/0229071 A1 | 9/2011 | Vincelette et al. |
| 2011/0272152 A1 | 11/2011 | Kaminsky et al. |
| 2011/0272153 A1 | 11/2011 | Boone et al. |
| 2011/0276140 A1 | 11/2011 | Vresilovic et al. |
| 2011/0303423 A1 | 12/2011 | Kaminsky et al. |

(56) References Cited

U.S. PATENT DOCUMENTS

| | | |
|---|---|---|
| 2012/0234535 A1 | 9/2012 | Dawson et al. |
| 2012/0285700 A1 | 11/2012 | Scott |
| 2013/0000896 A1 | 1/2013 | Boone |
| 2013/0000898 A1 | 1/2013 | Boone |
| 2013/0025861 A1 | 1/2013 | Kift et al. |
| 2013/0043025 A1 | 2/2013 | Scott |
| 2013/0045902 A1 | 2/2013 | Thompson et al. |
| 2013/0098607 A1 | 4/2013 | Kerr |
| 2013/0105147 A1 | 5/2013 | Scott |
| 2013/0112408 A1 | 5/2013 | Oxtoby |
| 2013/0153215 A1 | 6/2013 | Scott et al. |
| 2013/0153216 A1 | 6/2013 | Scott |
| 2013/0199777 A1 | 8/2013 | Scott |
| 2013/0199779 A1 | 8/2013 | Scott |
| 2013/0199780 A1 | 8/2013 | Scott |
| 2013/0206405 A1 | 8/2013 | Kift et al. |
| 2013/0328692 A1 | 12/2013 | Johannessen |
| 2014/0034305 A1 | 2/2014 | Dawson |
| 2014/0048259 A1 | 2/2014 | Menard |
| 2014/0054028 A1 | 2/2014 | Little et al. |
| 2014/0069641 A1 | 3/2014 | Kosik |
| 2014/0083694 A1 | 3/2014 | Scott et al. |
| 2014/0083706 A1 | 3/2014 | Scott et al. |
| 2014/0096959 A1 | 4/2014 | Hocking |
| 2014/0144627 A1 | 5/2014 | Salazar Hernandez et al. |
| 2014/0174744 A1 | 6/2014 | Boone et al. |
| 2014/0251596 A1 | 9/2014 | Gittins et al. |
| 2015/0034555 A1 | 2/2015 | Speirs et al. |
| 2015/0053401 A1 | 2/2015 | Khaled et al. |
| 2015/0083407 A1* | 3/2015 | Storm ................ E21B 47/008 166/250.03 |
| 2015/0083413 A1 | 3/2015 | Salazar et al. |
| 2015/0107833 A1 | 4/2015 | Boone et al. |
| 2015/0107834 A1 | 4/2015 | Shen et al. |
| 2015/0144345 A1 | 5/2015 | Bilozir et al. |
| 2016/0061014 A1 | 3/2016 | Sood et al. |
| 2016/0153270 A1 | 6/2016 | Chen et al. |
| 2017/0030173 A1* | 2/2017 | MacPhail ................ E21B 43/14 |
| 2017/0051597 A1 | 2/2017 | Akiya et al. |
| 2017/0130572 A1 | 5/2017 | Yuan et al. |
| 2017/0210972 A1 | 7/2017 | Williamson et al. |
| 2017/0241250 A1 | 8/2017 | Singh et al. |
| 2018/0030381 A1 | 2/2018 | Olson et al. |
| 2018/0073337 A1 | 3/2018 | Park et al. |
| 2018/0265768 A1 | 9/2018 | Williamson |
| 2019/0002755 A1 | 1/2019 | Wang et al. |
| 2019/0032460 A1 | 1/2019 | Khaled et al. |
| 2019/0032462 A1 | 1/2019 | Motahhari et al. |
| 2019/0063199 A1 | 2/2019 | Doraiswamy et al. |
| 2019/0119577 A1 | 4/2019 | Witham et al. |
| 2019/0120043 A1 | 4/2019 | Gupta et al. |

FOREIGN PATENT DOCUMENTS

| | | |
|---|---|---|
| CA | 0852003 A | 9/1970 |
| CA | 0956885 A | 10/1974 |
| CA | 0977675 A | 11/1975 |
| CA | 1015656 A | 8/1977 |
| CA | 1027851 A | 3/1978 |
| CA | 1059432 A | 7/1979 |
| CA | 1061713 A | 9/1979 |
| CA | 1072442 A | 2/1980 |
| CA | 1295118 C | 2/1992 |
| CA | 1300000 C | 5/1992 |
| CA | 2108723 A1 | 4/1995 |
| CA | 2108349 C | 8/1996 |
| CA | 2369244 C | 4/2005 |
| CA | 2147079 C | 10/2006 |
| CA | 2235085 C | 1/2007 |
| CA | 2281276 C | 2/2007 |
| CA | 2647973 A1 | 10/2007 |
| CA | 2304938 C | 2/2008 |
| CA | 2299790 C | 7/2008 |
| CA | 2633061 A1 | 7/2008 |
| CA | 2374115 C | 5/2010 |
| CA | 2652930 A1 | 7/2010 |
| CA | 2621991 C | 9/2010 |
| CA | 2660227 A1 | 9/2010 |
| CA | 2730875 A1 | 8/2012 |
| CA | 2971941 A1 | 12/2012 |
| CA | 2436158 C | 6/2013 |
| CA | 2553297 C | 7/2013 |
| CA | 2654848 C | 10/2013 |
| CA | 2777966 A1 | 11/2013 |
| CA | 2781273 C | 5/2014 |
| CA | 2804521 A1 | 7/2014 |
| CA | 2917260 A1 | 1/2015 |
| CA | 2917263 A1 | 1/2015 |
| CA | 2841520 A1 | 2/2015 |
| CA | 2785871 C | 5/2015 |
| CA | 2691399 C | 9/2015 |
| CA | 2847759 A1 | 9/2015 |
| CA | 2893170 A1 | 11/2015 |
| CA | 2853445 A1 | 12/2015 |
| CA | 2854171 A1 | 12/2015 |
| CA | 2898065 A1 | 1/2016 |
| CA | 2962274 A1 | 1/2016 |
| CA | 2890491 A1 | 2/2016 |
| CA | 2893221 C | 4/2016 |
| CA | 2872120 A1 | 5/2016 |
| CA | 2875846 C | 5/2016 |
| CA | 2900179 C | 5/2016 |
| CA | 2898943 C | 6/2016 |
| CA | 2897785 C | 7/2016 |
| CA | 2900178 C | 9/2016 |
| CA | 2707776 C | 11/2016 |
| CA | 2893552 C | 11/2016 |
| CA | 2935652 A1 | 1/2017 |
| CA | 2857329 C | 2/2017 |
| CA | 2915571 C | 2/2017 |
| CA | 2856460 C | 5/2017 |
| CA | 2956771 A1 | 8/2017 |
| CA | 2981619 A1 | 12/2017 |
| CA | 2875848 C | 5/2018 |
| CA | 2899805 C | 5/2018 |
| CA | 2928044 C | 7/2018 |
| CA | 2974714 C | 9/2018 |
| CA | 2965117 A1 | 10/2018 |
| CA | 2958715 C | 3/2019 |
| CN | 101870894 | 4/2009 |
| EP | 0144203 A2 | 6/1985 |
| EP | 0261793 A1 | 3/1988 |
| EP | 0283602 A1 | 9/1988 |
| EP | 0747142 B1 | 4/2001 |
| FR | 2852713 | 9/2004 |
| GB | 1457696 A | 12/1976 |
| GB | 1463444 A | 2/1977 |
| GB | 2156400 A | 10/1985 |
| GB | 2164978 A | 4/1986 |
| GB | 2286001 B | 10/1995 |
| GB | 2357528 A | 6/2001 |
| GB | 2391890 A | 2/2004 |
| GB | 2391891 A | 2/2004 |
| GB | 2403443 A | 1/2005 |
| KR | 20130134846 | 5/2012 |
| WO | 1982/01214 A1 | 4/1982 |
| WO | 1989/12728 A1 | 12/1989 |
| WO | 1994/21889 A3 | 9/1994 |
| WO | 1999/67503 A1 | 12/1999 |
| WO | 2000/25002 A1 | 5/2000 |
| WO | 2000/66882 A1 | 11/2000 |
| WO | 2001/81239 A2 | 11/2001 |
| WO | 2001/81715 A2 | 11/2001 |
| WO | 2001/92673 A2 | 12/2001 |
| WO | 2001/92768 A2 | 12/2001 |
| WO | 2002/086018 A2 | 10/2002 |
| WO | 2002/086276 A2 | 10/2002 |
| WO | 2003/010415 A1 | 2/2003 |
| WO | 2003/036033 A1 | 5/2003 |
| WO | 2003/036038 A2 | 5/2003 |
| WO | 2003/036039 A1 | 5/2003 |
| WO | 2003/036043 A2 | 5/2003 |
| WO | 2003/038233 A1 | 5/2003 |

(56) References Cited

FOREIGN PATENT DOCUMENTS

| WO | 2003/040513 | A2 | 5/2003 | |
|---|---|---|---|---|
| WO | 2003/062596 | A1 | 7/2003 | |
| WO | 2004/038173 | A1 | 5/2004 | |
| WO | 2004/038174 | A2 | 5/2004 | |
| WO | 2004/038175 | A1 | 5/2004 | |
| WO | 2004/050567 | A1 | 6/2004 | |
| WO | 2004/050791 | A1 | 6/2004 | |
| WO | 2004/097159 | A3 | 11/2004 | |
| WO | 2005/012688 | A1 | 2/2005 | |
| WO | WO-2013135288 | A1 * | 9/2013 | ......... E21B 43/2406 |
| WO | 2015/158371 | A1 | 10/2015 | |
| WO | 2017/222929 | A1 | 12/2017 | |

OTHER PUBLICATIONS

Andrade, M.R., et al. (2007), "Mixotrophic cultivation of microalga Spirulina platensis using molasses as organic substrate", *Aquaculture*, vol. 264, pp. 130-134.

Bayestehparvin, B., et al. (2015) "Dissolution an dMobilization of Bitumen at Pore Scale", *SPE174482-MS, Prepared for presentation at the SPE Canada Heavy Oil Technical Conference* held in Calgary, Alberta, Canada, Jun. 9-11, 2015; 23 pages.

Butler, R. M. et al. (1991) "A new process (VAPEX) for recovering heavy oils using hot water and hydrocarbon vapour", *CIM/SPE Annual Technical Conference* Jan.-Feb. vol. 30, No. 1, pp. 97-106.

Butler, R. M. et al. (1993) "Recovery of Heavy Oils Using Vapourized Hydrocarbon Solvents: Further Development of the Vapex Process" *The Journal of Canadian Petroleum Technology*, June, vol. 32, No. 6, pp. 56-64.

Castanier, L.M., et al. (2005) "Heavy oil upgrading in-situ via solvent injection and combustion: A "new" method", *EAGE 67th Conference & Exhibition*—Madrid, Spain, Jun. 13-16, 2005; 4 pages.

Cristofari, J., et al. (2008) "Laboratory Investigation Of The Effect Of Solvent Injection On In-Situ Combustion" SPE 99752 prepared for presentation at the 2006 SPE/DOE Symposium on Improved Oil Recovery, Tulsa, Apr. 22-26 11 pages.

Cunha, L.B. (2005) "Recent In-Situ Oil Recovery-Technologies for Heavy- and Extraheavy-Oil Reserves", *SPE 94986*, prepared for presentation at the 2005 SPE Latin American and Caribbean Petroleum Enginerring Conference held in Rio de Janeiro, Brazil, Jun. 20-23; 5 pages.

Deng, X (2005) "Recovery Performance and Economics of Steam/Propane Hybrid Process." SPE/PS-CIM/CHOA 97760, PS2005-341, SPE/PS-CIM/CHOA International Thermal Operations and Heavy Oil Symposium, copyright, pp. 1-7.

Diaz, J. A. D. (2006) "An Experimental Study of Steam and Steam-Propane Injection Using a Novel Smart Horizontal Producer to Enhance Oil Production in the San Ardo Field." Presentation given at Sponsor's Meeting, Crisman Institute, Aug. 3, Department of Petroleum Engineering, Texas A&M University (7 pages).

Doan, Q., et al. (2011) "Potential Pitfalls From Successful History-Match Simulation Of A Long-Running Clearwater-Fm Sagd Well Pair" *SPE 147318*, Prepared for presentation at the SPE Annual Technical Conference and Exhibition held in Denver, Colorado, Oct. 30-Nov. 2; 9 pages.

D'Silva, J, et al. (2008) "In-Situ Combustion With Solvent Injection" *SPE 117684*, Prepared for presentation at the SPE International Thermal Operations and Heavy Oil Symposium held in Calgary, Alberta, Canada, Oct. 20-23, 11 pages . . . .

D'Silva, J., et al. (2011) "Integration Of In-Situ Combustion With Solvent Injection—A Detailed Study" *SPE 141570*, Prepared for presentation at the SPE Projects and Facilities Challenges Conference at METS held in Doha, Qatar, Feb. 13-16, 11 pages.

Dunn-Norman, S., et al. (2002) "Recovery Methods For Heavy Oil In Ultra-Shallow Reservoirs" *SPE 76710*, prepared for presentation at the SPE Western Regional/AAPG Pacific Section Joint Meeting held in Anchorage, Alaska, May 20-22, 6 pages.

Frauenfeld, T.W., et al. (2006) "Economic Analysis Of Thermal Solvent Processes" *Pet-Soc 2006-164*; Presented at the Petroleum Socity's 7th Canadian International Peteroleum Conference (57th Annual Technical Meeting), Calgary, Alberta, Canada, Jun. 13-15, 2006; 9 pages.

Gates, I.D., et al. (2011) "Evolution Of In Situ Oil Sands Recovery Technology: What Happened And What's New?" *SPE150686*, Prepared for presentation at the SPE Heavy Oil Conference and Exhibition held in Kuwait City, Kuwait, Dec. 12-14, 2011; 10 pages.

Ghoodjani, E., et al. (2012) "A Review On Thermal Enhanced Heavy Oil Recovery From Fractured Carbonate Reservoirs" *SPE 150147*, Prepared for presentation at the SPE Heavy Oil Conference Canada held in Calgary, Alberta, Canada, Jun. 12-14, 2012; 8 pages.

Goldthorpe, S. (2013) "Cement Plant CO2 to Dme," *IEAGHG Information Paper*, 2013-IP9, Jun. 2013, 1 page.

Greaser, G.R., et al. (2003) "New Thermal Recovery Tech nology and Technology Transfer for Successful Heavy Oil Development." *SPE69731, Society of Petroleum Engineers, Inc.*, 7 pages.

Hong, K.C. (1999) "Recent Advances in Steamflood Technology." SPE 54078, Copyright 1999, Society of Petroleum Engineers, Inc., 14 pages.

Jaiswal, N. J. (2006) "Experimental and Analytical Studies of Hydrocarbon Yields Under Dry-, Steam-, and Steam with Propane-Distillation." Presentation given at Crisman Institute's Halliburton Center for Unconventional Resources, Aug. 3, 2006, Department of Petroleum Engineering, Texas A&M University (5 pages).

Jiang, Q., et al. (2010) "Evaluation Of Recovery Technologies For The Grosmont Carbonate Reservoirs" *Journal of Canadian Petroleum Technology*, vol. 49, No. 5, pp. 56-64.

Kamal, C., et al. (2012), "Spirulina platensis—A novel green inhibitor for acid corrosion of mild steel", *Arabian Journal of Chemistry*, vol. 5, pp. 155-161.

Khaledi, R., et al. (2018) "Azeotropic Heated Vapour Extraction—A New Thermal-Solvent Assisted Gravity Drainage Recovery Process", *SPE189755-MS*, SPE Canada Heavy Oil Technical Conference held in Calgary, Alberta, Canada, Mar. 13-14, 2018, 20 pages.

Lei, H., et al. (2012) "An Evaluation Of Air Injection As A Follow-Up Process To Cyclic Steam Stimulation In A Heavy Oil Reservoir" *SPE 150703*, Prepared for presentation at the SPE Heavy Oil Conference Canada held in Calgary, Alberta, Canada, Jun. 12-14, 2012; 13 pages.

Lennox, T.R. et al. (1980) "Geology Of In Situ Pilot Project, Wabasca Oil Sands Deposit, Alberta" *Saskatchewan Geological Society Special Publication No. 5*; Conference and Core Seminar, Regina, Oct. 15-17, 1980; pp. 267-268.

Lim, G.B. et al. (1994) "Three Dimensional Scaled Physcial Modeling of Solvent Vapour Extraction of Cold Lake Bitumen," *Canadian SPE Int'l Conf. on Recent Advances in Horizontal Well Applications*, Paper No. HWC94-46, Calgary, Canada, Mar. 20-23, 1994, 11 pages.

Lim, G.B. et al. (1995) "Cyclic Stimulation of Cold Lake Oil Sand with Supercritical! Ethane," *SPE #30298*, Int'l Heavy Oil Symposium, Calgary, Alberta, Canada, Jun. 19-21, 1995, pp. 521-528.

Lyubovsky, M., et al. (2005) "Catalytic Partial 'Oxidation of Methane to Syngas' at Elevated Pressures," *Catalysis Letters*, v. 99, Nos. 3-4, Feb. 2005, pp. 113-117.

Mamora, D. D., (2006) "Thermal Oil Recovery Research at Texas A&M in the Past Five Years—an Overview." Presentation given at the Crisman Institute Halliburton Center for Unconventional Resources, Research Meeting Aug. 3, Department of Petroleum Engineering, Texas A&M University (13 pages).

Mert, B.D., et al. (2011) "The role of Spirulina platensis on corrosion behavior of carbon steel", *Materials Chemistry and Physics*, vol. 130, pp. 697-701.

Mokrys, I. J., et al. (1993) "In-Situ Upgrading of Heavy Oils andBitumen by Propane Deasphalting: The Vapex Process" SPE 25452, Mar. 21-23, Oklahoma City, OK, pp. 409-424.

Mulac, A.J., et al. (1981) "Project Deep Steam Preliminary Field Test Bakersfield, California." SAND80-2843, Printed Apr. 62 pages.

(56) References Cited

OTHER PUBLICATIONS

Naderi, K., et al. (2015) "Effect Of Bitumen Viscosity And Bitumen-Water Interfacial Tension On Steam Assisted Bitumen Recovery Process Efficiency", *Journal of Petroleum Science and Engineering* 133, pp. 862-868.

Nasr, T.N., et al. (2005) "Thermal Techniques For The Recovery Of Heavy Oil And Bitumen" *SPE 97488* prepared for presentation at the SPE International Improved Oil Recovery Conferencein Asia Pacific held in Kuala Lumpur, Malaysia, Dec. 5-6, 2005. 15 pages.

Nasr, T.N. et al. (2006) "New Hybrid Steam-Solvent Processes For The Recovery Of Heavy Oil And Bitumen" *SPE 101717* Prepared for presentation at the Abu Dhabi International Petroleum Exhibition and Conference held in Abu Dhabi, U.A.E., Nov. 5-8, 2006; 17 pages.

National Energy Board, (2004) "Canada's Oil Sands. Opportunities and Challenges to 2015." An Energy Market Assessment, May (158 pages).

Nexant, Inc. (2008), "Dimethyl Ether Technology and Markets," CHEMSystems PERP Program Report 07/08S3, Dec. 2008, 7 pages.

NTIS, Downhole Steam-Generator Study, vol. 1, Conception and Feasibility Evaluation. Final Report, Sep. 1978-Sep. 1980, Sandia National Labs, Albuquerque NM, Jun. 1982. 260 pages.

Oceaneering; Website: http://www.oceaneering.com/Brochures/MFX%20%Oceaneering%20Multiflex.pdf, Oceaneering Multiflex, Oceaneering International, Incorporated, printed Nov. 23, 2005, 2 pages.

Qi, G.X. et al. (2001) "DME Synthesis from Carbon Dioxide and Hydrogen Over Cu—Mo/HZSM-5," *Catalysis Letters*, V. 72, Nos. 1-2, 2001, pp. 121-124.

Redford, et al. (1980) "Hydrocarbon-Steam Processes for Recovery of Bitumen from Oil Sands" *SPE8823*, Prepared for presentation at the First Joint SPE/DOE Symposium on Enhanced Oil Recovery at Tulsa, Oklahoma, Apr. 20-23, 12 pages . . . .

Saeedfar, A., et al. (2018) "Critical Consideration for Analysis of RF-Thermal Recovery of Heavy Petroleum" *SPE-189714-MS*, Prepared for presentation at the SPE Canada Heavy Oil Technical Conference held in Calgary, Alberta, Canada, Mar. 13-14, 2018; 13 pages.

Seibert, B. H. (2012) "Sonic Azeotropic Gravity Extraction of Heavy Oil From Oil Sands", SPE157849-MS, SPE Heavy Oil Conference Canda held in Calgary, Alberta, Canada, Jun. 12-14, 2012, 10 pages.

Sharma, J. et al. (2010) "Steam-Solvent Coupling At The Chamber Edge In An In Situ Bitumen Recovery Process" *SPE 128045*, Prepared for presentation at the SPE Oil and Gas India Conference and Exhibition held in Mumbai, India Jan. 20-22, 26 pages.

Stark, S.D. (2013) "Cold Lake Commercialization Of The Liquid Addition To Steam For Enhancing Recovery (Laser) Process" *IPTC 16795*, Prepared for presentation at the International Petroleum Technology Conference held in Beijing, China, Mar. 26-28, 2013, 15 pages.

Wan Nik, W.B., et al. (2012), "Marine Extracts as Corrosion Inhibitor for Aluminum in Seawater Applications", *International Journal of Engineering Research and Applications* (IJERA), vol. 2, Issue 1; pp. 455-458.

Zhang, L. et al. (2013) "Dehydration of Methanol to Dimethyl Ether Over y—AL2O3 Catalyst: Intrinsic Kinetics and Effectiveness Factor," *Canadian Journal Of Chem. Engineering*, v.91, Sep. 2013, pp. 1538-1546.

International Search Report and the Written Opinion of the International Searching Authority, or the Declaration (2 pages), International Search Report (4 pages), and Written Opinion of the International Searching Authority (6 pages) for International Application No. PCT/US2007/080985 dated Feb. 28, 2008.

International Preliminary Report on Patentability (2 pages); Written Opinion of the International Searching Authority (6 pages); dated Apr. 23, 2009 in PCT International Application No. PCT/US2007/080985 filed Oct. 10, 2007 (Total 8 pages).

Yuan, J. Y. et al., Subcool, Fluid Productivity, and Liquid Level Above a SAGD Producer; Journal of Canadian Petroleum Technology, 52 (05), pp. 360-367, 2013.

* cited by examiner

SYSTEMS AND METHODS FOR ESTIMATING AND CONTROLLING LIQUID LEVEL USING PERIODIC SHUT-INS

CROSS-REFERENCE TO RELATED APPLICATION

This application claims priority from Canadian Patent Application 2,983,541 filed Oct. 24, 2017 entitled SYSTEMS AND METHODS FOR DYNAMIC LIQUID LEVEL MONITORING AND CONTROL, and Canadian Patent Application 3,020,827 filed Oct. 15, 2018 entitled SYSTEMS AND METHODS FOR ESTIMATING AND CONTROLLING LIQUID LEVEL USING PERIODIC SHUT-INS, the entirety of which are incorporated by reference herein.

FIELD

This disclosure relates generally to monitoring liquid levels during petroleum extraction, and more specifically to systems and methods for utilizing distributed pressure and temperature measurements taken during shut-in conditions to determine local profile values, and to subsequently use the determined profile values and distributed temperature measurements taken along the production wellbore during operating conditions to determine the liquid level in the formation above the horizontal section.

BACKGROUND

Generally speaking, gravity drainage refers to a recovery process in which gravity is the primary force used to recover heavy oil and bitumen from a reservoir. An example of a gravity drainage process is Steam Assisted Gravity Drainage (SAGD). In a typical SAGD process, two horizontal wellbores are drilled into an oil-containing reservoir. The wellbores are positioned generally parallel to each other and spaced apart vertically, with one wellbore being positioned above the other wellbore, typically by about 4 to 6 meters. During production, high pressure steam is injected into the upper wellbore (also referred to as the injector) to heat the oil in the surrounding formation, thereby reducing its viscosity such that it can flow through the formation under the force of gravity. The heated oil—along with any condensed steam (i.e. water)—drains into the lower wellbore (also referred to as the producer), and the collected oil and water are pumped to the surface.

Solvent Assisted—Steam Assisted Gravity Drainage (SA-SAGD) and Vapor Assisted Petroleum Extraction (VAPEX) are examples of other gravity drainage recovery processes for producing heavy oil. SA-SAGD and VAPEX are similar to SAGD, but instead of (or in addition to) steam, one or more vaporized solvents (e.g. ethane, propane) are injected to reduce the viscosity of oil in the surrounding formation.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with one broad aspect of this disclosure, there is provided a method for determining a liquid level in a formation between a horizontal segment of an injection wellbore and a horizontal segment of a production wellbore, the method comprising: shutting-in the production wellbore; shutting-in the injection wellbore; measuring, using at least one first temperature sensor positioned in the production wellbore segment, a local shut-in temperature for each of a plurality of inflow zones between a heel and a toe of the production wellbore segment; measuring, using at least one first pressure sensor positioned in the production wellbore segment, a local shut-in pressure for each of the plurality of inflow zones; determining, for each of the plurality of inflow zones: a local shut-in liquid level, based on the measured shut-in pressure at that inflow zone and a shut-in pressure for an injection zone horizontally aligned with that inflow zone; a local shut-in subcool value, based on the measured shut-in temperature at that inflow zone; and a local profile value, based on the local shut-in subcool value for that inflow zone and the local shut-in liquid level for that inflow zone; resuming flow in the production wellbore; resuming flow in the injection wellbore; after resuming flow in the production and injection wellbores, for at least one of the plurality of inflow zones: measuring, using the at least one first temperature sensor positioned in the production wellbore, a local operating temperature for that inflow zone; determining a local operating subcool value, based on the measured operating temperature at that inflow zone; determining a local operating liquid level, based on the local operating subcool value for that inflow zone and the local profile value for that inflow zone.

In some embodiments, a local operating liquid level is determined for each of the plurality of inflow zones.

In some embodiments, the determined local shut-in subcool value is based on a local saturation temperature of an injection fluid at the measured shut-in pressure at that inflow zone and the measured shut-in temperature at that inflow zone.

In some embodiments, the method further comprises, after resuming flow in the production and injection wellbores, measuring, using the at least one first pressure sensor, a local operating pressure for that inflow zone, and the determined local operating subcool value is based on a local saturation temperature of the injection fluid at the measured operating pressure at that inflow zone and the measured operating temperature at that inflow zone.

In some embodiments, the determined local operating liquid level is based on the local shut-in liquid level for that inflow zone, a difference between the local operating subcool value for that inflow zone and the local shut-in subcool value for that inflow zone, and the local profile value for that inflow zone.

In some embodiments, the local shut-in temperature for each of the plurality of injection zones is obtained using at least one second temperature sensor positioned in the injection wellbore.

In some embodiments, the local shut-in pressure for each of the plurality of injection zones is obtained using at least one second pressure sensor positioned in the injection wellbore.

In some embodiments, the method further comprises: after determining the local operating liquid level for the at least one of the plurality of inflow zones: comparing the determined local operating liquid level for the at least one of the plurality of inflow zones to a target liquid level; in response to the determined local operating liquid level for the at least one of the plurality of inflow zones being greater than the target liquid level, performing at least one of: increasing a pump rate of an artificial lift device to increase the total flowrate for fluids exiting the production wellbore segment; increasing an open area of at least one of the plurality of inflow zones; and unblocking the open area of at least one of the plurality of inflow zones; and in response to the target liquid level being greater than the determined local operating liquid level for the at least one of the plurality of production zones, performing at least one of: decreasing the pump rate of the artificial lift device to decrease the total flowrate for fluids exiting the production wellbore segment; decreasing the open area of at least one of the plurality of inflow zones; and blocking the open area of at least one of the plurality of inflow zones.

In some embodiments, in response to the determined local operating liquid level for at least one of the plurality of inflow zones being greater than the target liquid level, the method further comprises increasing an injection rate of a fluid injector to increase a total flow rate of fluids into the injector wellbore, in order to maintain pressure in a steam chamber.

In some embodiments, in response to the determined local operating liquid level for at least one of the plurality of inflow zones being greater than the target liquid level, the method further comprises decreasing an injection rate of a fluid injector to decrease a total flow rate of fluids into the injector wellbore, in order to decrease a bitumen drainage rate in a steam chamber.

In some embodiments, in response to the target liquid level being greater than the determined local operating liquid level for at least one of the plurality of inflow zones, the method further comprises decreasing an injection rate of a fluid injector to decrease a total flow rate of fluids into the injector wellbore, in order to maintain pressure in a steam chamber.

In some embodiments, in response to the target liquid level being greater than the determined local operating liquid level for at least one of the plurality of inflow zones, the method further comprises increasing an injection rate of a fluid injector to increase a total flow rate of fluids into the injector wellbore, in order to increase a bitumen drainage rate in a steam chamber.

In some embodiments, the method further comprises: after determining the local operating liquid level for the at least one of the plurality of inflow zones: shutting-in the production and injection wellbores a second time; determining updated local profile values for each of the plurality of inflow zones; resuming flow in the production and injection wellbores a second time; after resuming flow in the production and injection wellbores the second time, for at least one of the plurality of inflow zones: determining an updated local operating liquid level, based on an updated local shut-in liquid level for that inflow zone, a difference between an updated local operating subcool value for that inflow zone and an updated local shut-in subcool value for that inflow zone, and the updated local profile value for that inflow zone.

In some embodiments, the method further comprises: after determining the local profile values during a first shut-in period: determining updated local profile values during a second shut-in period; determining, for at least one of the plurality of inflow zones, a profile adjustment factor based on the local profile value for that inflow zone, the updated local profile value for that inflow zone, and a duration between the first and second shut-in periods; and after resuming flow in the production and injection wellbores following the second shut-in period, for at least one of the plurality of inflow zones: determining a local operating liquid level, based on the local shut-in liquid level for that inflow zone, a difference between the local operating subcool value for that inflow zone and the local shut-in subcool value for that inflow zone, the updated local profile value for that inflow zone, the profile adjustment factor for that inflow zone, and a duration between the second shut-in period and a period during which the local operating temperature and pressure were measured when determining the subcool value for that inflow zone.

In some embodiments, the method further comprises: after shutting in the injection wellbore, and before determining the local shut-in liquid levels: performing a gas purge of the injector wellbore.

In accordance with another broad aspect, there is provided a system for determining a liquid level in a formation between a horizontal segment of an injection wellbore and a horizontal segment of a production wellbore, the system comprising: at least one first temperature sensor positioned in the production wellbore segment to measure a local temperature for each of a plurality of inflow zones between a heel and a toe of the production wellbore segment; at least one first pressure sensor positioned in the production wellbore segment to measure a local pressure for each of the plurality of inflow zones; one or more processors operatively coupled to the at least one first temperature sensor and the at least one first pressure sensor, the one or more processors, collectively, configured to: during a period in which the production wellbore and the injection wellbore are shut-in: determine, for each of the plurality of inflow zones: a local shut-in liquid level, based on a measured shut-in pressure at that inflow zone and a shut-in pressure for an injection zone horizontally aligned with that inflow zone; a local shut-in subcool value, based on a measured shut-in temperature at that inflow zone; and a local profile value, based on the local shut-in subcool value for that inflow zone and the local shut-in liquid level for that inflow zone; and after resuming flow in the production and injection wellbores: determine, for at least one of the plurality of inflow zones: a local operating subcool value, based on a measured operating temperature at that inflow zone; and a local operating liquid level, based on the local operating subcool value for that inflow zone and the local profile value for that inflow zone.

In some embodiments, the one or more processors are configured to determine the local shut-in subcool value for each of the plurality of inflow zones based on the measured shut-in temperature at that inflow zone and a local saturation temperature of an injection fluid at the measured shut-in pressure at that inflow zone.

In some embodiments, the one or more processors are configured to determine the local operating subcool value for the at least one of the plurality of inflow zones based on the measured operating temperature at that inflow zone and a local saturation temperature of the injection fluid at a measured operating pressure at that inflow zone.

In some embodiments, the one or more processors are configured to determine the local operating liquid level based on the local shut-in liquid level for that inflow zone, a difference between the local operating subcool value for that inflow zone and the local shut-in subcool value for that inflow zone, and the local profile value for that inflow zone.

In some embodiments, the at least one first temperature sensor comprises a thermocouple or a set of thermocouples.

In some embodiments, the at least one first temperature sensor comprises a distributed temperature sensor (DTS).

In some embodiments, the system further comprises at least one second temperature sensor positioned in the injection wellbore to measure a local temperature for each of a plurality of injection zones between a heel and a toe of the injection wellbore segment.

In some embodiments, the at least one first pressure sensor comprises a distributed pressure sensing system.

In some embodiments, the at least one first pressure sensor is positioned exterior of a production string located in the production wellbore segment.

In some embodiments, the at least one first pressure sensor comprises fewer discrete pressure sensors than the number of inflow zones in the plurality of inflow zones, and wherein, for inflow zones without a discrete pressure sensor positioned therein, the one or more processors are configured to determine local pressures for those inflow zones using a model based on pressures from discrete pressure sensors positioned in other inflow zones.

In some embodiments, the system further comprises at least one second pressure sensor positioned in the injection wellbore to measure a local pressure for each of the plurality of injection zones.

In some embodiments, the at least one second pressure sensor comprises fewer discrete pressure sensors than the number of injection zones in the plurality of injection zones, and wherein, for injection zones without a discrete pressure sensor positioned therein, the one or more processors are configured to determine local pressures for those injection zones using a model based on pressures from discrete pressure sensors positioned in other injection zones.

In some embodiments, the plurality of inflow zones comprises at least five inflow zones.

In some embodiments, the system further comprises a display device operatively coupled to the one or more processors, and the one or more processors are further configured to cause the display device to display a graphical representation of the determined local operating liquid levels for the at least one of the plurality of inflow zones.

In some embodiments, the graphical representation of the determined local operating liquid levels for the at least one of the plurality of inflow zones comprises a representation of local operating liquid levels for at least ten percent of a length between the heel and the toe of the production wellbore segment.

It will be appreciated by a person skilled in the art that a method or apparatus disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1:
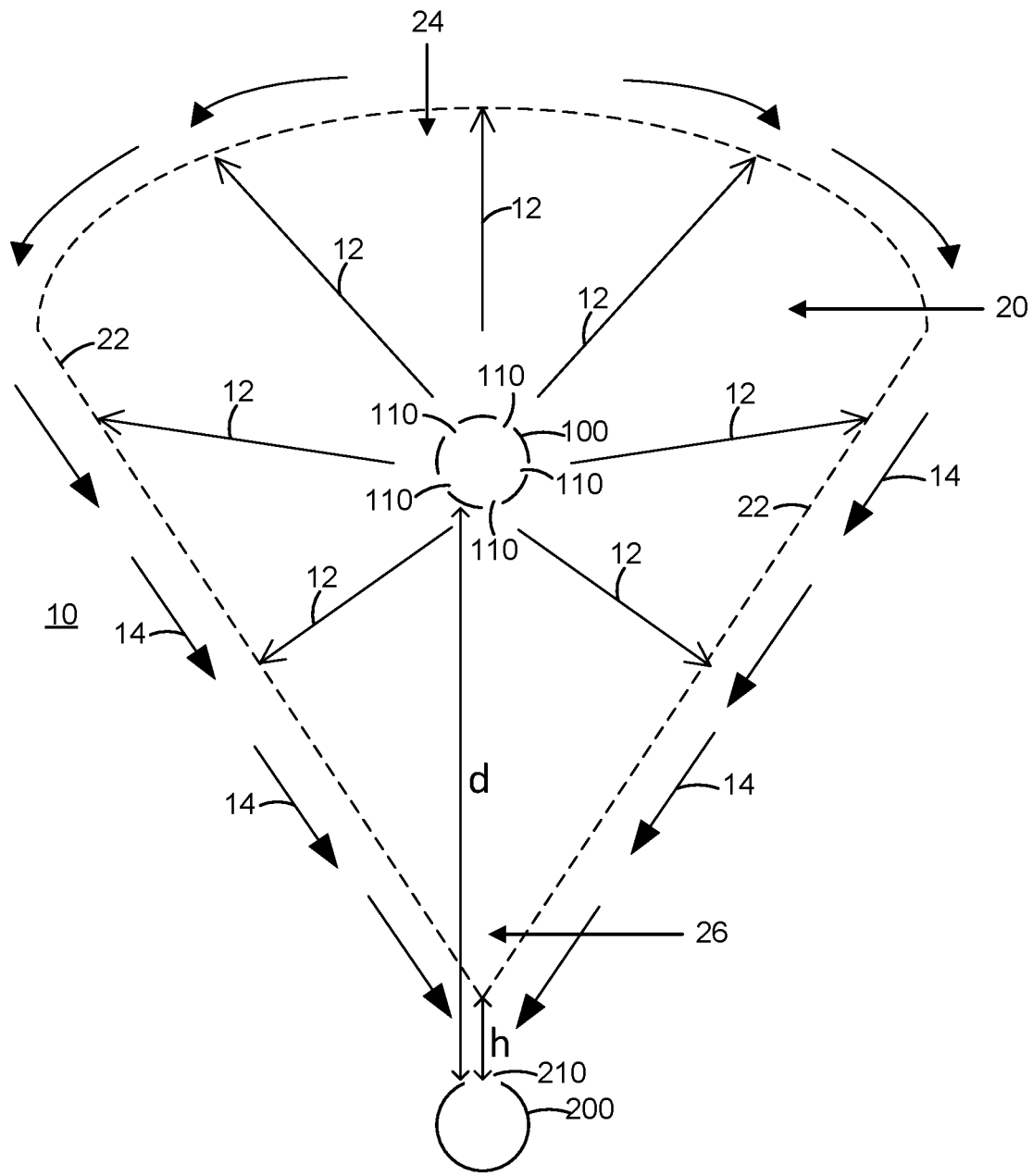
FIG. 1 is a schematic axial cross-section view of a pair of horizontal wellbores through a formation being used in a typical gravity drainage recovery process.

The drawings included herewith are for illustrating various examples of articles, methods, and apparatuses of the teaching of the present specification and are not intended to limit the scope of what is taught in any way.

DETAILED DESCRIPTION

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

FIG. 1 illustrates a schematic axial cross-section of a typical SAGD recovery process. A pair of parallel horizontal wellbore segments 100, 200 are provided in a formation or reservoir 10 and are spaced apart vertically by a distance d. Steam is pumped down from the surface and along the upper wellbore 100, where it passes into the formation 10 via one of a number of apertures 110 (e.g. screens, perforations) provided in the wellbore casing. Upper wellbore 100 may also be referred to as an injector wellbore or simply an injector. As steam is injected, thermal energy from the steam is transferred to the formation. This thermal energy increases the temperature of petroleum products present in the formation (e.g. heavy crude oil or bitumen), which reduces their viscosity and allows them to flow downwards under the influence of gravity towards the lower wellbore 200, where it passes into the wellbore 200 via one of a number of apertures 210 (e.g. screens, perforations) provided in the wellbore casing. Lower wellbore 200 may also be referred to as a producer wellbore or simply a producer.

As the steam initially enters the reservoir, a 'steam chamber' 20 is formed. The boundary or wall 22 of the steam chamber represents a boundary between fluids in a gaseous state (including injected steam—as indicated by arrows 12—and any gasses present in the formation) and fluids in a liquid state (including heavy crude oil or bitumen and condensed steam). As steam injection continues, thermal energy is released from the steam as it condenses against the wall 22 of the steam chamber. Heated petroleum products and condensate (as indicated by arrows 14) flow along or adjacent to the wall 22, and down into producer wellbore 200. Within the steam chamber, fluids in a gaseous state tend to rise towards the top of the chamber 24 due to their relatively low density, while liquids tend to collect at the bottom of the steam chamber 26. In the illustrated example, the liquid level at the bottom of the steam chamber is a distance h above the producer wellbore 200.

While during normal operation lower wellbore 200 acts as a producer (i.e. fluid is extracted from the formation via wellbore 200), it will be appreciated that wellbore 200 may alternately act as an injector. For example, during start-up of an SAGD process steam may be pumped into both wellbores 100 and 200 to initially heat the formation proximate both the upper and lower wellbores, following which wellbore 200 may be transitioned to a producer by discontinuing the steam flow into this wellbore.

Figure 2:
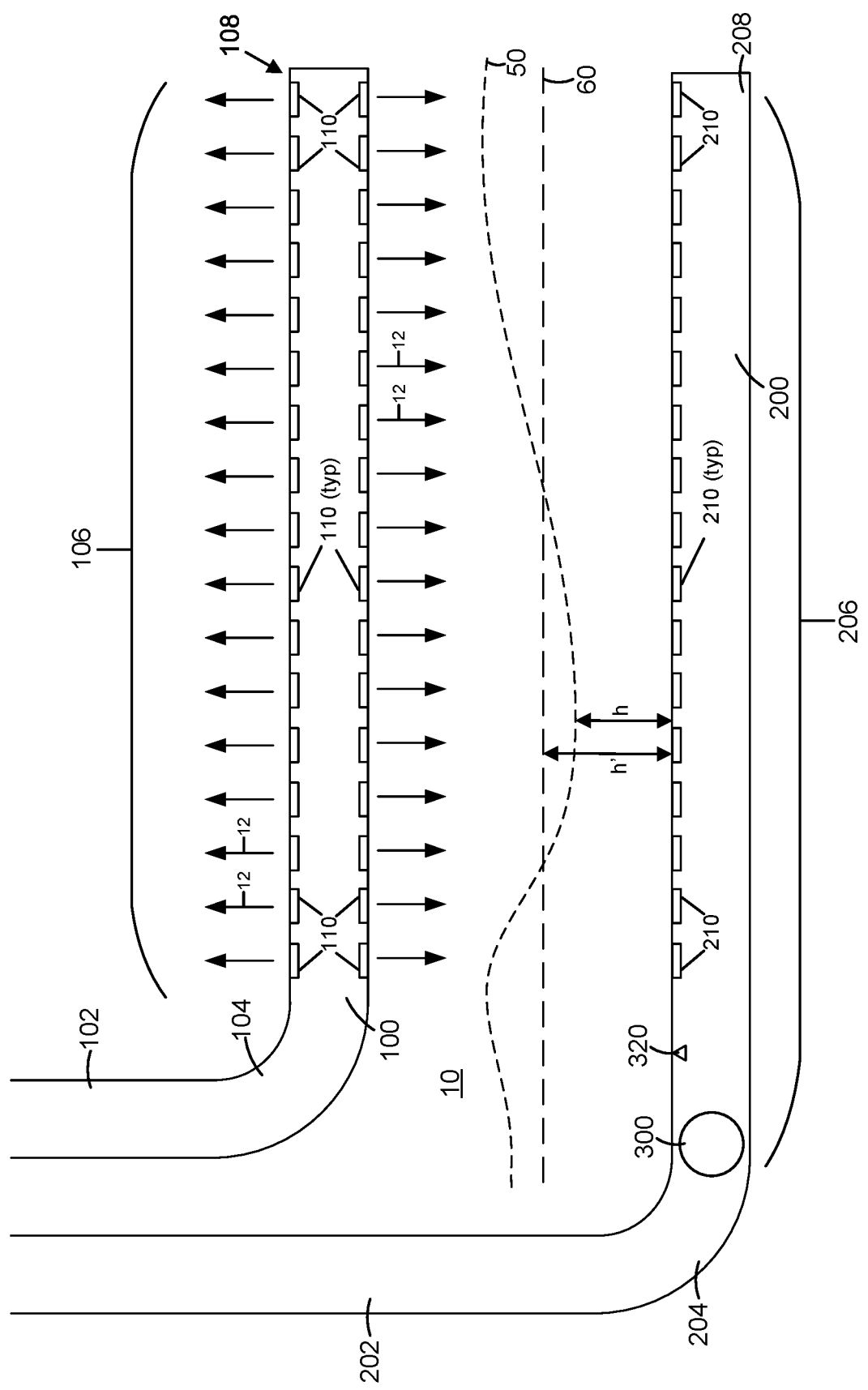
FIG. 2 is a schematic longitudinal cross-section view of the horizontal wellbores of FIG. 1, with a first liquid level and a first estimated liquid level.

FIG. 2 illustrates a schematic longitudinal cross-section of a typical SAGD recovery process. Steam is pumped down from the surface through the vertical section 102 and the heel 104 of the injector wellbore 100, and along the horizontal segment 106 towards the toe 108. A number of outflow locations 110 (e.g. screens, perforations, or other apertures) are provided along the injector wellbore casing to allow the steam to access the formation. Heated petroleum products and condensate from the injected fluids flow down through the formation 10 and into producer wellbore 200 through one of a number of inflow locations 210 (e.g. screens, perforations, or other apertures) provided along the horizontal segment 206 of the producer wellbore casing between the heel 204 of the producer wellbore and the toe 208. One or more artificial lift devices 300 (e.g. electrical submersible pumps) is used to pump fluids collected along the horizontal segment 206 of the producer wellbore 200 up to the surface through the vertical section 202.

In the illustrated example, the line 50 represents the liquid level h in the formation (e.g. the level of the liquid at the bottom of the steam chamber) above the producer wellbore 200 along its horizontal segment. As shown, the liquid level h typically varies along the length of the horizontal wellbore segment due to local differences in one or more parameters, such as porosity of the formation, temperature and pressure levels, composition of petroleum products, etc.

In the example illustrated in FIG. 2, the liquid level h is above the producer wellbore at all points along the horizontal segment 206. Accordingly, the fluids entering the producer wellbore through apertures 210 are in their liquid phase. This is typically considered to be a preferable operating condition, as artificial lift devices (e.g. a rod pump or an electric submersible pump) are generally much more efficient when pumping liquids than when pumping a mix of liquid and gas. For example, pumping fluids in a gas phase may be less efficient than pumping liquids, resulting in increased energy expenditures to extract the fluids to the surface. Also, pumping gasses may lead to increased wear and/or maintenance requirements for the lift device, and may result in a reduced operating lifespan.

In a typical SAGD process, the liquid level h is approximated by comparing the temperature of the injected steam (e.g. the saturation temperature or boiling point of water at the operating pressure of the injector) to the temperature of the fluids exiting the horizontal segment of the producer wellbore 206. For example, a temperature sensor 320 may be provided proximate the heel 204 of the wellbore 200 and/or proximate the artificial lift device 300 to obtain a temperature value for the fluids being produced. The difference between these temperatures is often referred to as the 'subcool'. (It will be appreciated that the term 'subcool' may have one or more alternative definitions, and may be used in other contexts to refer to similar, or unrelated, concepts. For example, some operators may determine a distributed temperature and define a 'reservoir subcool' as the local difference between the reservoir temperature and the distributed temperature.) A higher subcool (i.e. a greater difference in injection and production temperatures) is considered indicative of a higher liquid level in the formation, while a lower subcool is considered indicative of a lower liquid level. Put another way, the subcool is used as a proxy for the liquid level. In FIG. 2, line 60 illustrates an example approximation of a liquid level h' based on the subcool.

If the subcool is low, indicating a lower liquid level, the pump rate of the artificial lift device 300 may be reduced to decrease the flow rate out of the horizontal segment. Reducing the pump rate may also result in increased pressure along the horizontal segment 206 of the producer wellbore 200 as a result of increasing liquid level in the reservoir and reduced frictional pressure drop within the well. A reduction in flowrate and/or increase in pressure for the producer can be expected to result in an increased liquid level in the formation, and accordingly a reduced risk of steam coning.

Conversely, if the subcool is high, this may result in an increased potential to 'flood' the injector wellbore. Also, a higher subcool (and the attendant higher liquid level) may indicate a less than optimum production rate. Also, a high subcool may result in reduced production, as fluids (e.g. heavy oil or bitumen) entering the producer at lower temperatures would be expected to have a higher viscosity and lower mobility. Accordingly, if the subcool is high the pump rate of the artificial lift device 300 may be increased to increase the flow rate out of the horizontal segment, and/or to reduce the pressure along the horizontal segment 206 of the producer wellbore 200. An increase in flowrate and/or decrease in pressure for the producer can be expected to increase production from the formation, which may be desirable given a reduced risk of steam coning due to the relatively high liquid level.

While the subcool can be used to approximate the liquid level, this estimation may have one or more limitations. For example, the single temperature value for the fluids being produced is an average temperature for fluids along the entire wellbore segment, and therefore may fail to capture local temperature variations. Thus, the liquid level is assumed to be approximately constant along the entire length of the horizontal segment. This can make it difficult to detect steam coning or other undesirable conditions.

Figure 3:
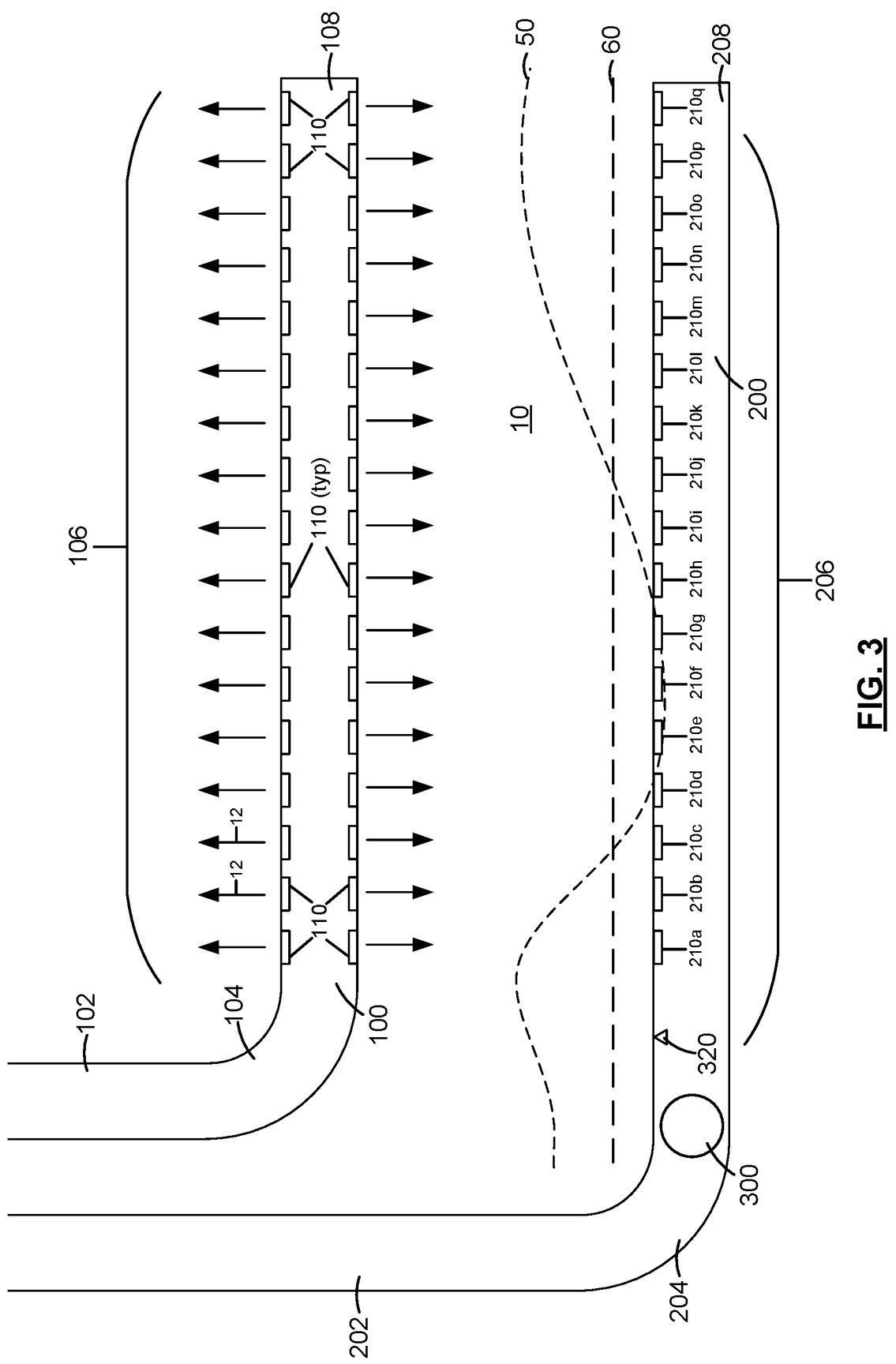
FIG. 3 is the schematic longitudinal cross-section view of FIG. 2, with a second liquid level and a second estimated liquid level.

For example, FIG. 3 illustrates another schematic longitudinal cross-section of a SAGD recovery process. In this example, the liquid level h is above the producer wellbore at inflow locations $210_a$-$210_d$ and $210_h$-$210_q$ along the horizontal segment 206, but it is below the producer wellbore at inflow locations $210_e$-$210_g$. Accordingly, while fluids entering the producer wellbore at inflow locations $210_a$-$210_d$ and $210_h$-$210_q$ are in their liquid phase, at least some of the fluids entering the producer wellbore at inflow locations $210_e$-$210_g$ are in a gaseous phase. In other words, some of the steam injected from the injector wellbore effectively 'short circuits' through the formation and passes into the producer. This situation may be characterized as 'steam coning', and is typically considered to be a less preferable operating condition. For example, as a result of this steam 'bypass', less thermal energy may be transferred to the formation.

In the example illustrated in FIG. 3, fluid entering the producer at inflow locations $210_e$-$210_g$ will comingle with fluid entering the producer at inflow locations $210_a$-$210_d$ and $210_h$-$210_q$ before a temperature is sensed by the temperature sensor 320. This comingling may mute any local temperature variance, as the temperature sensor 320 only detects an average temperature of the producer fluid. Accordingly, local inflow temperatures indicative of steam coning may not be detected based on the subcool. Instead, steam coning may be detected based on an increase in the percentage of water (or other injected fluids) in the produced fluids, e.g. when sampled at the surface. Alternatively, steam coning may be detected when the inflow to the artificial lift device 300 contains fluids in both liquid and gaseous phases, e.g. as indicated by the pump registering a fault condition. Alternatively, thermocouples or DTS fiber may provide direct detection methods for steam coning, as a local temperature value above a predetermined threshold may be indicative of steam coning at that location (although knowing a location of steam coning typically does not provide sufficient information to predict a liquid level away from the coning point). Each of these detection methods may be characterized as reactive detection, in that steam coning is only detected after it has occurred.

Figure 4:
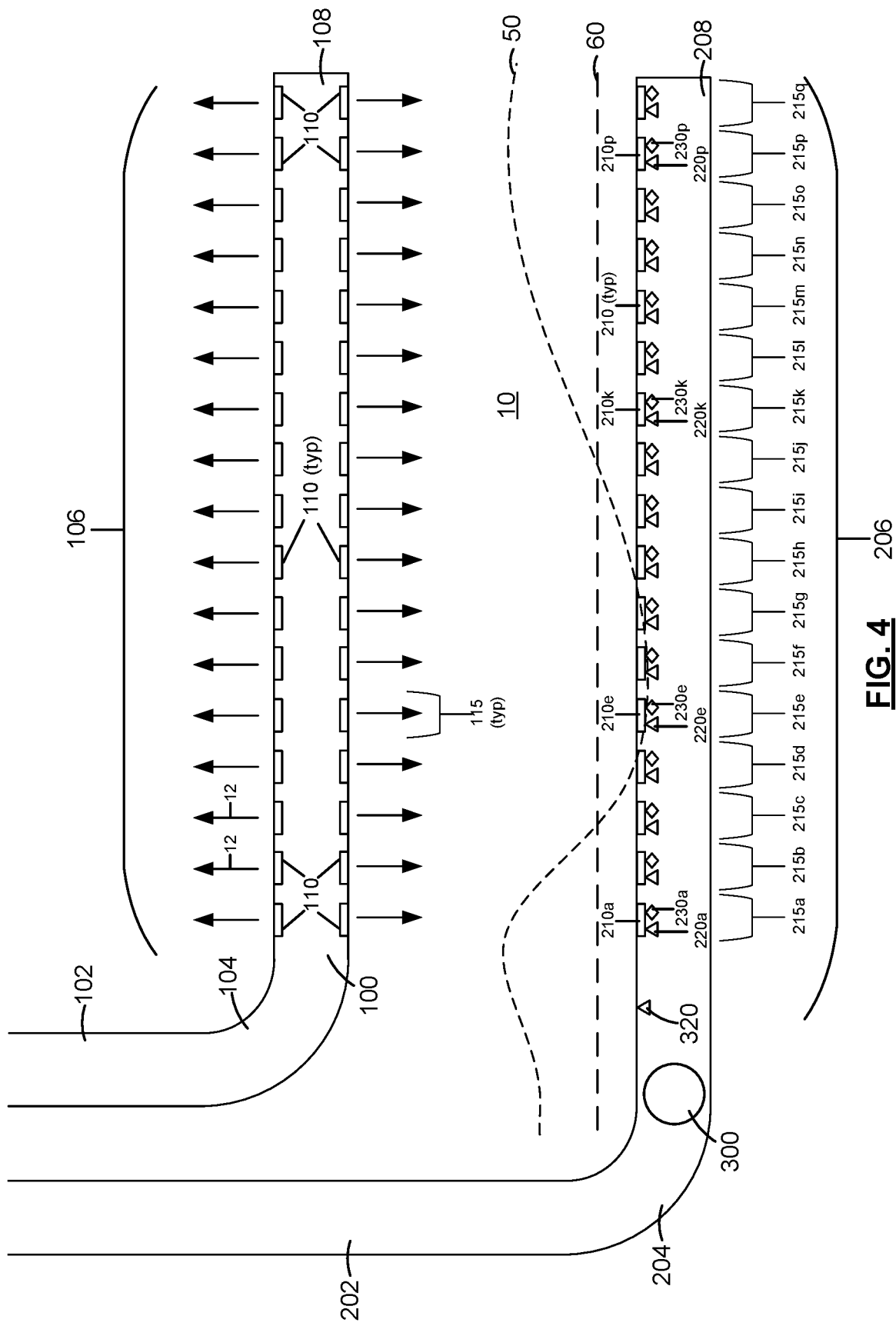
FIG. 4 is a schematic longitudinal cross-section view of a pair of horizontal wellbores in accordance with one example embodiment.

FIG. 4 illustrates a schematic longitudinal cross-section of a pair of horizontal wellbores that are provided with sensors for measuring temperature and pressure at a number of inflow locations $210_a$-$210_g$ distributed along the length of the horizontal segment 206 of the producer 200. While 17 inflow locations are shown, it will be appreciated that more or fewer inflow locations may be provided in a horizontal segment 206. In this example, each inflow location 210 is also considered to be an inflow zone 215. As discussed further below, by obtaining pressure and temperature data for a number of zones along the horizontal segment 206 of the producer wellbore, this may allow a more accurate and/or more detailed model of the reservoir conditions surrounding the wellbores, including the liquid level h above the producer, to be developed. A more accurate model of the liquid level h may allow for improved control of production during a SAGD process.

In the example illustrated in FIG. 4, each inflow location 210 (and zone 215) to the producer has an associated temperature sensor 220. Each temperature sensor $220_a$-$220_g$ may be a discrete unit, such as a thermocouple, resistive thermal device (RTD), and the like. Alternatively, a distributed temperature sensor (DTS) may be used to obtain temperature data for each inflow location $210_a$-$210_q$. For example, a sensor based on Optical Time Domain Reflectometry (OTDR) or Optical Frequency Domain Reflectometry (OFDR) may be used. For each inflow location, the local temperature in the reservoir adjacent the inflow location $T_{res\_inflow}$ may be assumed as being equal to a temperature value $T_{inflow}$ measured by a temperature sensor 220, or may be based on a measured temperature value $T_{inflow}$ subject to an adjustment factor (e.g. to compensate for a temperature drop across the reservoir/wellbore interface).

Also, in the example illustrated in FIG. 4 each inflow location 210 (and zone 215) has an associated pressure sensor $230_a$-$230_q$. Each pressure sensor may be a discrete unit, such as a quartz-based sensor, bubble tube, electromagnetic resonating element (ERE), electrical resonating diaphragm, and the like. Alternatively, a distributed pressure sensing system incorporating one or more distributed Fiber Bragg Grating pressure sensors may be used to obtain pressure data for each inflow location $210_a$-$210_q$. Alternatively, multiple individual Fabry Perot gauges connected to the same fiber optic trunkline may be used to obtain pressure data for each inflow location $210_a$-$210_q$ or inflow zone $215_a$-$215_q$. For example, a sensor system such as a SageWatch™ Subsurface Surveillance System, available from SageRider, Inc., or the like may be used. For each inflow location, the local pressure in the reservoir adjacent the inflow location $P_{res\_inflow}$ may be assumed as being equal to a pressure value $P_{inflow}$ measured by a pressure sensor 230, or may be based on a measured pressure value $P_{inflow}$ subject to an adjustment factor (e.g. to compensate for a pressure drop across the reservoir/wellbore interface).

Preferably, one or more of the pressure sensors 230 are connected directly to the formation. For example, they may be positioned exterior of a production string located in the production wellbore segment. Positioning one or more of the pressure sensors 230 in direct connection with the reservoir may improve the accuracy of the local reservoir pressure measurements. For example, local pressure measurements taken using sensors positioned in a pipe (e.g. inside a production string) may be impacted by pressure equilibration upstream and downstream due to fluid flow in the pipe. Also, in areas where there is active pressure communication (e.g. near an inflow location or an inflow control device) pressure measurements taken using sensors positioned inside a production string may be impacted by the upstream and downstream pressures in the pipe. For example, there may be a drop in measured pressure during a period of transient flow following a shut-in while the pressure equilibrates.

Optionally, pressure sensors 230 connected directly to the formation (e.g. positioned exterior of a production string located in the production wellbore segment) may be positioned approximately midway between adjacent inflow locations and/or inflow control devices along the production wellbore segment. In such locations, the influence of pressure communication within the well fluids may be reduced or preferably minimized, and thus improve and preferably maximize the correlation between the pressure measurements recorded using the pressure sensors 230 and the actual reservoir pressure.

In some examples, a distributed data acquisition system may include one or more multi-function sensors capable of obtaining both pressure and temperature data at each inflow location $210_a$-$210_q$ and/or for each inflow zone $215_a$-$215_q$. Accordingly, the same physical sensor apparatus may function as both a pressure sensor and as a temperature sensor to obtain pressure and temperature data for one or more locations along the wellbore. For example, sensor systems such as CT-MORE, available from Core Laboratories of Houston, Tex., or CanePT™ Optical Pressure and Temperature Sensor, available from Weatherford International, or the like may be used.

Figure 5:
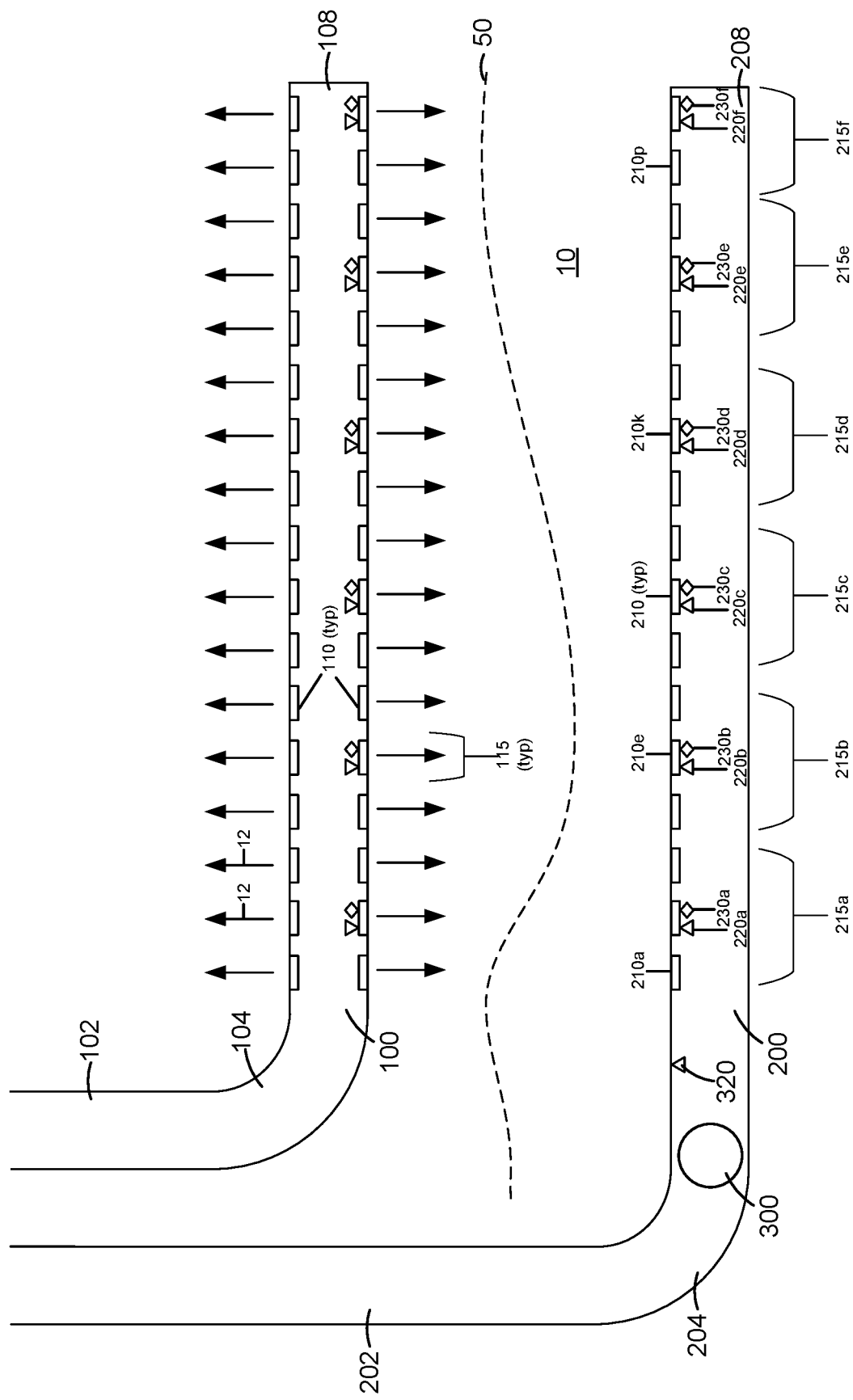
FIG. 5 is a schematic longitudinal cross-section view of a pair of horizontal wellbores in accordance with another example embodiment.

In the example illustrated in FIG. 4, each inflow zone 215 is shown with a single aperture 210 to the producer. Alternatively, some or all of the inflow zones may include more than one discrete aperture through which fluids can enter the producer from the formation. FIG. 5 illustrates a schematic longitudinal cross-section of a pair of horizontal wellbores that are provided with sensors for measuring temperature and pressure at a number of inflow zones $215_a$-$215_f$ distributed along the length of the horizontal segment 206 of the producer 200. In the illustrated example, each inflow zone $215_a$-$215_e$ includes three apertures 210 through which fluid can enter the producer from the formation, and inflow zone $210_f$ includes two such apertures. It will be appreciated that each zone may have more or fewer apertures.

In the example illustrated in FIG. 4, each inflow zone 215 to the producer is shown with an associated temperature and pressure sensor. Alternatively, one or more of the inflow zones may not include a discrete pressure sensor. For example, discrete temperature sensors (or a distributed temperature sensor) may be provided to measure local temperatures at every 1 meter or so along the production wellbore, while discrete pressure sensors (or a distributed pressure sensing system) may be provided to measure local pressure values at every 10 meters or so along the production wellbore.

Figure 6:
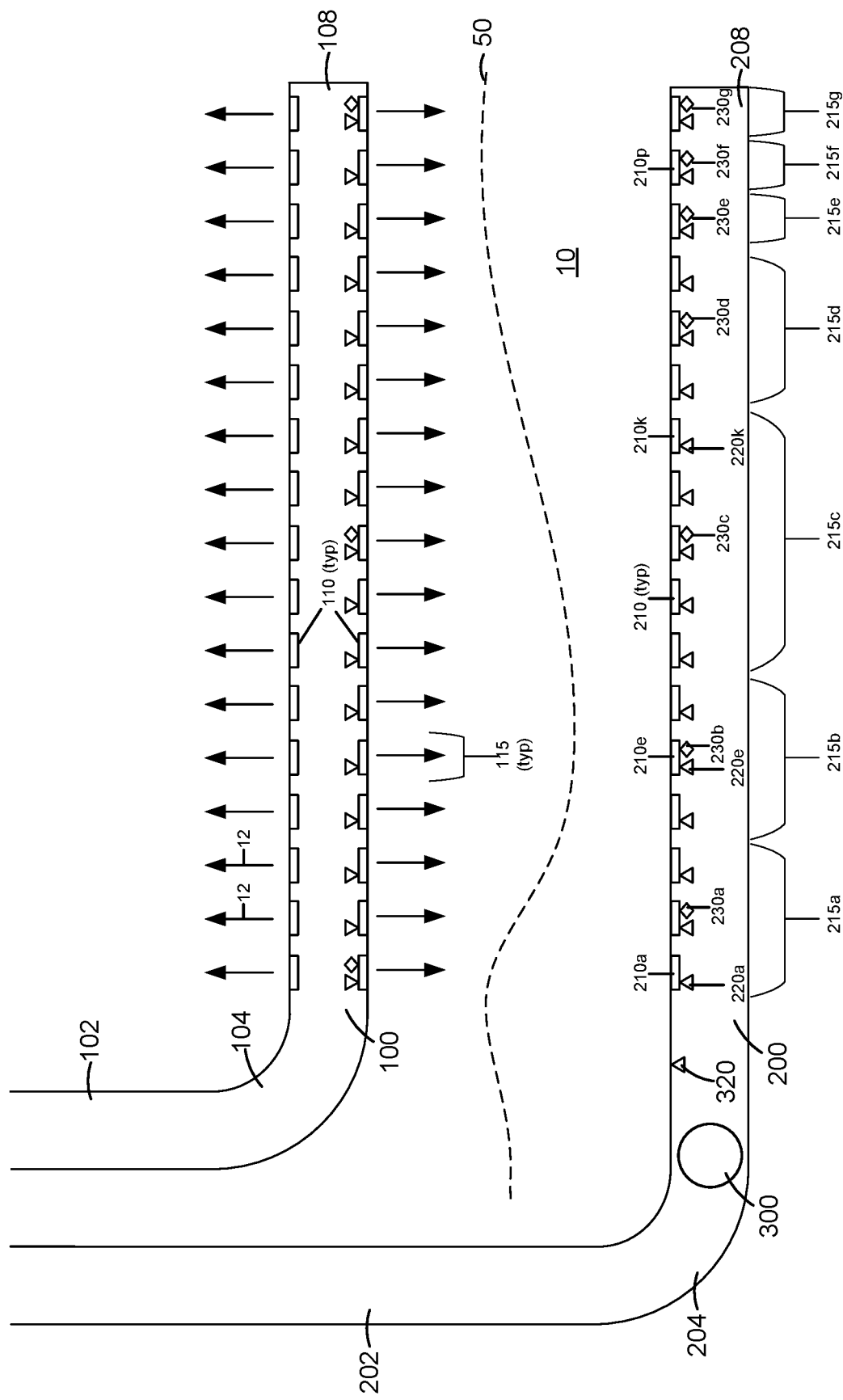
FIG. 6 is a schematic longitudinal cross-section view of a pair of horizontal wellbores in accordance with another example embodiment.

FIG. 6 illustrates a schematic longitudinal cross-section of a pair of horizontal wellbores that are provided with sensors for measuring temperature and pressure for a number of inflow zones $215_a$-$215_g$ distributed along the length of the horizontal segment 206 of the producer 200. In the illustrated example, pressure sensors $230_a$-$230_g$ are provided at, respectively, inflow locations $210_b$, $210_e$, $210_i$, $210_m$, $210_o$, $210_p$, and $210_q$, such that each inflow zone $215_a$-$215_g$ is centered around a respective pressure sensor $230_a$-$230_g$.

In some embodiments, the locations of pressure sensors $230_a$-$230_g$ may be determined based on the geology of the formation. For example, a single pressure sensor 230 may be positioned at the approximate midpoint of a region of relatively constant porosity, as the formation pressure along such a region may be expected to be relatively constant.

In the example illustrated in FIG. 6, each inflow zone 215 is centered around a respective pressure sensor 230. Alternatively, to determine a local pressure value for inflow zones that do not have a pressure sensor positioned therein, a flow model (e.g. using pressure data from sensors at one or more other inflow zones) may be used. For example, a local pressure value for an inflow zone 215 may be determined using a flow model that computes pressure values along the production wellbore between the locations of pressure sensors 230 positioned in adjacent inflow zones.

Figure 7:
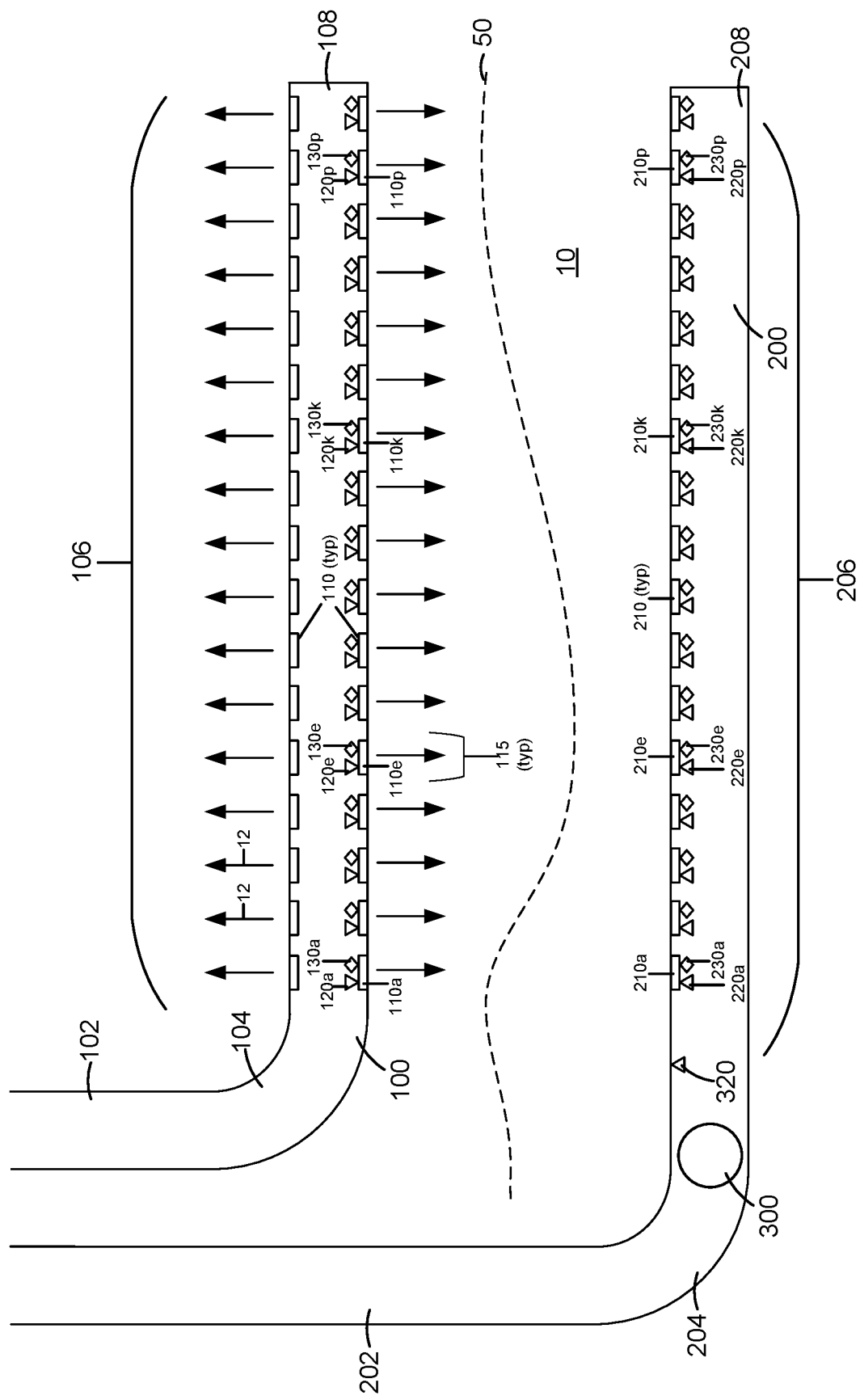
FIG. 7 is a schematic longitudinal cross-section view of a pair of horizontal wellbores in accordance with another example embodiment.

In the example illustrated in FIG. 4, each inflow location 210 or zone 215 along the producer has an associated temperature sensor 220 and an associated pressure sensor 230. In the example illustrated in FIG. 7, each injection location or zone 115 along the injector also has an associated temperature sensor 120 and an associated pressure sensor 130. As with the sensors for the producer, each pressure sensor and/or each temperature sensor may be a discrete unit, or a distributed data acquisition system may be used to obtain temperature and/or pressure data at each injection zone 115. That is, the same physical sensor apparatus may function as both a pressure sensor and as a temperature sensor at one or more locations along the injector wellbore.

By obtaining pressure and temperature data for a number of locations or zones distributed along the horizontal segment of the producer wellbore during shut-in conditions, local liquid levels may be estimated along the horizontal length of the well pair (which may account for local heterogeneities in the formation). This may allow a more accurate and/or more detailed baseline model to be developed for the reservoir conditions (e.g. liquid level) along the wellbore. A more accurate baseline model may allow for improved control of production during a gravity drainage process (e.g. SAGD).

For example, during normal operation, pressure at any given location along the producer wellbore is a function of: i) the fluid head between the injector and producer; ii) the pressure drop across the completion (including any skin effects); iii) the thermodynamic state of the fluid; iv) the frictional pressure loss along the wellbore segment between locations, which may be determined as a direct function of the vapor and liquid fractions of the fluids (which can be determined e.g. from a thermodynamic equilibrium calculation or a non-equilibrium calculation) and the flow rate through the producer wellbore; and v) while flowing, the pressure also depends on the Darcy's Law pressure drop due to the viscous effects of fluid flowing through porous media.

However, when the well is shut-in, the flow effects quickly become negligible (e.g. drop to zero) leaving the fluid head between the injector and producer as the only component of pressure. It should be recognized that the fluid head is the sum of the reservoir pressure and the height of liquid above the producer. Accordingly, a reasonable estimation of the liquid level for a given location or zone above the producer wellbore may be made using temperatures and 'static' pressures measured under shut-in conditions, and an assumed fluid composition (e.g. as obtained from a calibration of the producing well model, or obtained from sampling produced fluids during operation). Such 'local' estimates of liquid levels may be combined to form a more detailed and/or more accurate estimate of the liquid level as it varies along the length of the producer wellbore at the time the wells are shut-in.

Also, by obtaining pressure and temperature data for a number of locations or zones distributed along the horizontal segment of the producer wellbore during shut-in conditions, local profile values may be estimated for the well pair (which may account for local heterogeneities in the formation). These profile values may be characterized as a relationship between a subcool change and a change in the liquid level (e.g. a change in local subcool corresponding to a 1 m change in a local liquid level). Once production has resumed following the shut-in, local operating liquid levels may be estimated using local profile values in conjunction with local pressure and temperature measurements taken during operating conditions.

Accordingly, determining local operating temperatures and pressures for a number of locations or zones along the horizontal segment of a producer wellbore may allow for the determination of local subcool values, which, along with local profile values, may allow an improved calculation of local liquid levels between the injector wellbore and the producer wellbore. This may enable well pair operation based on local liquid levels estimated from local subcools, rather than a single average liquid level based on the average subcool.

A more accurate and/or more detailed model for the reservoir conditions (e.g. local liquid levels) along the wellbore may also facilitate faster identification and/or responses to system changes, which may have one or more advantages. For example, improved responses to system changes may allow for a more efficient use of steam or other injected fluids. Improved responses to system changes may also allow for improved run life for an ESP or other artificial lift device. Improved responses to system changes may also allow for lower temperature operations near inflow locations, which may improve the expected operating life of producer screens, as these screens may be 'burnt through' or otherwise damaged by prolonged exposure to direct steam production (e.g. if exposed to injector fluids that pass through the formation during 'steam coning').

Figure 8:
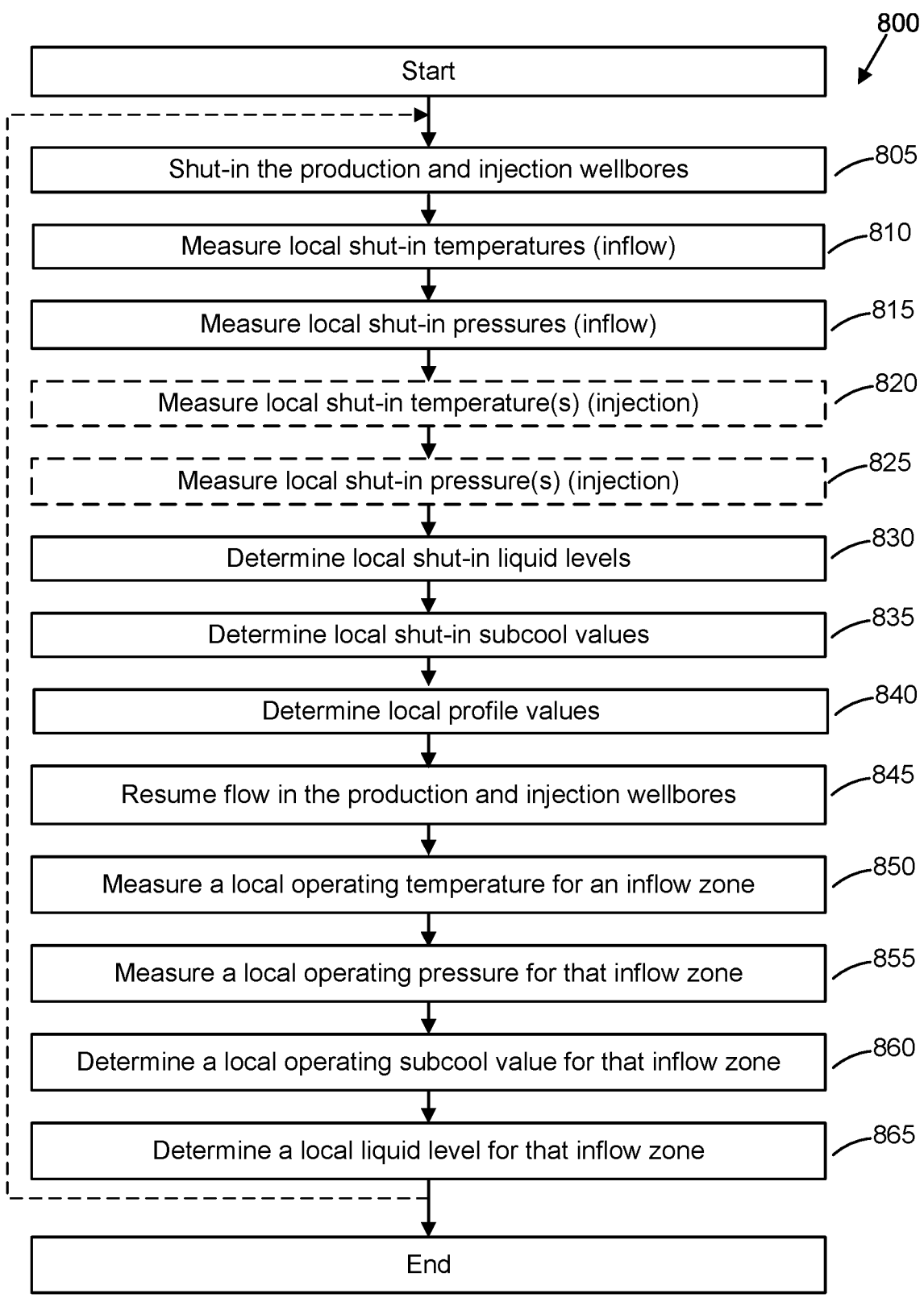
FIG. 8 is a simplified process flow diagram for a method for determining a liquid level in a formation between a horizontal segment of an injection wellbore and a horizontal segment of a production wellbore in accordance with one embodiment.

Referring to FIG. 8, there is illustrated a method 800 for determining a liquid level in a formation between a horizontal segment of an injection wellbore and a horizontal segment of a production wellbore. Method 800 may be performed using apparatus as illustrated in FIGS. 4 to 7 or any other suitable apparatus.

At 805, the production wellbore and the injection wellbore are shut-in. Optionally, the injector may undergo a gas purge in order to reduce the liquid level in the injector annulus to obtain a more accurate bottom hole pressure for the injector wellbore from a wellhead pressure gauge. For example, an inert gas such as $N_2$ may be pumped into the injector wellbore to displace any condensed vapour present in the injector wellbore into the reservoir.

At 810, values for local shut-in temperatures (i.e. a temperature measured after the wellbore has been shut-in) for a plurality of inflow zones (e.g. $T_{inflow\_1}$ to $T_{inflow\_n}$ or $T_{res\_inflow}$ to $T_{res\_inflow}$ n for n zones), are measured using one or more temperature sensors distributed along the producer wellbore 200.

At 815, values for local shut-in pressures (i.e. a pressure measured after the wellbore has been shut-in) for a plurality of inflow zones (e.g. $P_{inflow\_1}$ to $P_{inflow\_n}$ or $P_{res\_inflow\_1}$ to $P_{res\_inflow\_n}$ for n zones), are measured using one or more pressure sensors distributed along the producer wellbore 200.

Optionally, at 820, values for local shut-in temperatures for a plurality of injection zones (e.g. $T_{inj\_1}$ to $T_{inj\_n}$ for n zones) may be measured using one or more temperature sensors distributed along the injector wellbore 100. Alternatively, a shut-in temperature for the injection zones may be estimated based on, e.g. wellhead measurements and/or a saturation curve for the injected fluid(s).

Optionally, at 825, values for local shut-in pressures for a plurality of injection zones (e.g. $P_{inj\_1}$ to $P_{inj\_n}$ for n zones), are measured using one or more pressure sensors distributed along the injector wellbore 100. Alternatively, a shut-in pressure for the injection zones may be estimated based on, e.g. wellhead measurements and/or a saturation curve for the injected fluid(s), or any other suitable method.

For example, under saturated conditions, the saturation curve for the injection fluid can be used to determine the saturation pressure as a function of saturation temperature and injected solvent concentration:

$$P_{sat}=f(T_{sat},Conc_{solvent}) \quad (1)$$

Accordingly, under saturation conditions, a measurement of temperature provides a direct value for the saturation pressure. For example, for SA-SAGD, a temperature measurement and injected solvent concentration can be used to determine a pressure value.

As another example, for SAGD, assuming no pressure drop due to flow, and assuming that the injector wellbore is filled with steam, the static bottom hole pressure may be calculated using a pressure measurement taken at the wellhead and known steam properties:

$$P_{bottom\_hole}=P_{wellhead}+(\rho_{steam})(g)(h) \quad (2)$$

where $\rho_{steam}$ is the density for steam and h is the height difference between the bottom hole location and the location of the wellhead measurement. Alternatively, if accumulated liquid is blown out with a gas (e.g. during a purge operation using $N_2$ gas), $\rho_{steam}$ may be replaced with $\rho_{gas}$. Simulation results indicate that reservoir temperature/pressure at the injector is relatively uniform in areas of good steam conformance (i.e. where steam actually enters the formation). It will be appreciated that additional measurements (e.g. temperatures measured for an observation well associated with the injector/producer wellpair) may optionally be used to correct the estimation of the injector pressure.

It will be appreciated that the production and injection wellbores may be shut-in for a number of reasons, such as for periodic scheduled maintenance, or an unscheduled power outage. Preferably, steps 810 to 825 may be performed during an otherwise scheduled shut-in, as this may limit non-production time for the recovery process.

At 830, a local shut-in liquid level is determined under static flow conditions for each of the plurality of inflow zones. Preferably, the shut-in liquid level for an inflow zone is based on the measured shut-in pressure at that inflow zone, and a shut-in pressure for an injection zone horizontally aligned with that inflow zone.

Figure 9:
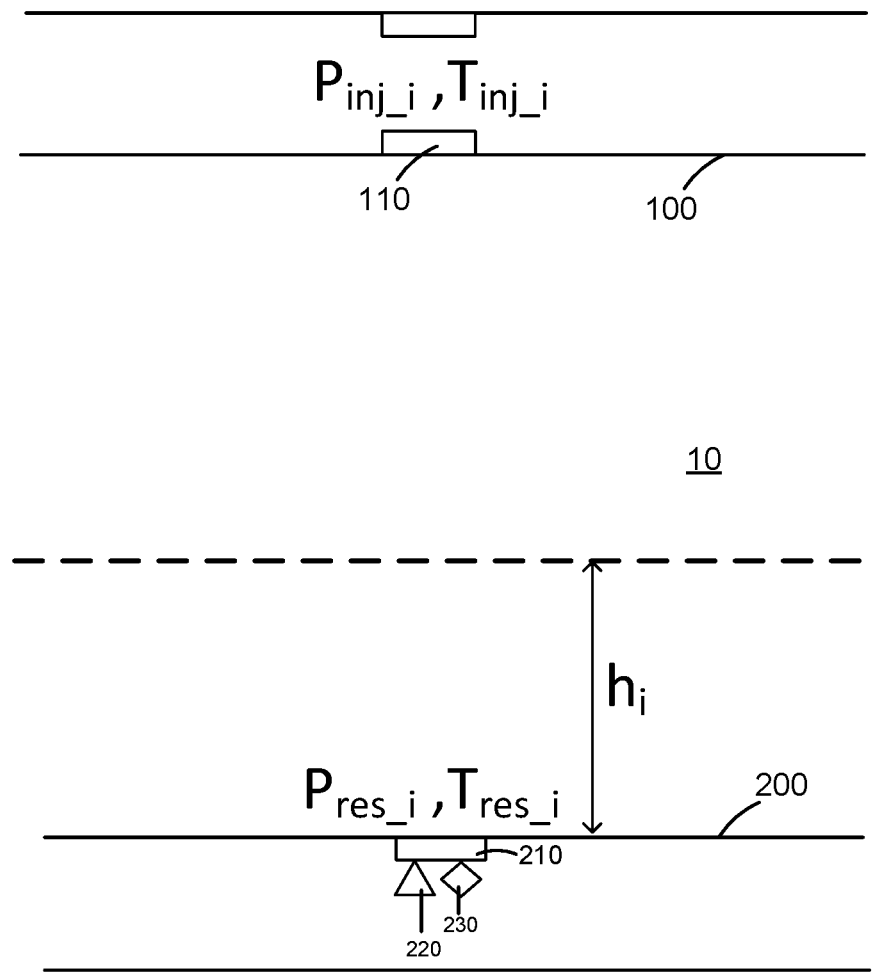
FIG. 9 is a schematic illustration of an estimated liquid level between a pair of horizontal wellbores.

For example, with reference to FIG. 9, the local liquid level $h_i$ above an inflow location or zone may be determined based on the local reservoir pressure $P_{res\_i}$ as measured at 815, the local pressure in the injector wellbore $P_{inj\_i}$ at a point above the local reservoir location (e.g. as measured at 825 or as otherwise determined/estimated), and the local density of the fluid (which may be an assumed value—for example, the density of the fluid in the reservoir above the producer wellbore 200 may be estimated using $P_{res\_inflow\_i}$ (or $P_{inflow\_i}$), $T_{res\_inflow\_i}$ (or $T_{inflow\_i}$), and a known or expected composition of the fluid). For example, the local liquid level $h_i$ may be determined using:

$$h_i = \frac{P_{res\_inflow\_i} - P_{inj\_i}}{\rho_L \times g} \quad (3)$$

where g is the gravitational constant, and $\rho_L$ is the density of the liquid in the reservoir. For example, density may be measured at the surface, either with online instruments or with collected samples, and these surface values may then be corrected to bottom hole conditions (e.g. by assuming that the surface composition is the same as the composition in the reservoir).

For some processes (e.g. the injection of pure steam, or a pure solvent such as pentane, hexane, etc.), the local pressure in the injector wellbore $P_{inj\_i}$ may be assumed constant over the entire length of the wellbore (e.g. $P_{inj\_i}=P_{inj}$). In other processes, such as SA-SAGD or VAPEX, this assumption may be less accurate. Alternatively, the pressure distribution along the injector may be estimated, e.g. using the injection pressure and a frictional flow model along the injection well.

Figure 10:
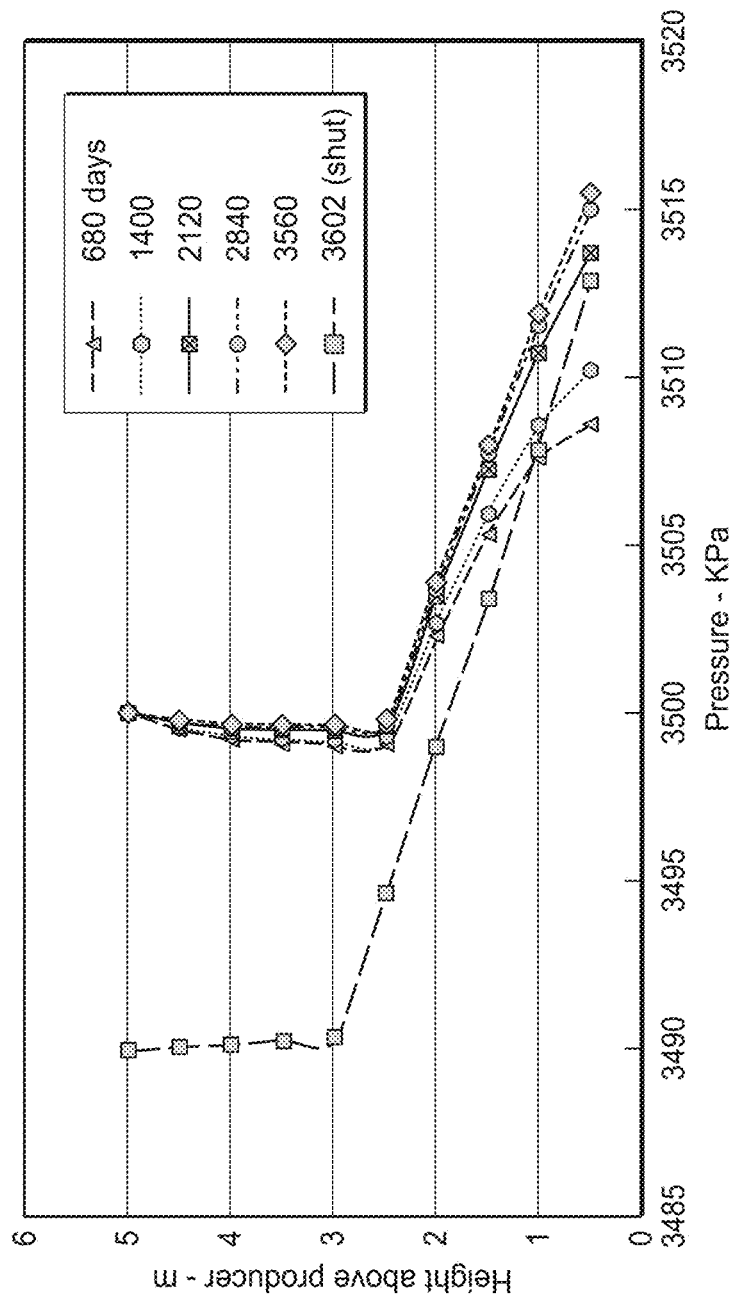
FIG. 10 is a plot of simulation results for local liquid level height as a function of pressure during a simulated SAGD operation.

Typically, the changes in liquid level in the reservoir may be considered negligible directly following the well shut-in. For example, the liquid level may not change significantly within the first two days or so following a shut-in. FIG. 10 is a plot of local liquid level height (y-axis) as a function of reservoir pressure (x-axis) during a simulated SAGD operation using injector and producer wellbores spaced 5 m apart, where the liquid level was being held at about 2.5 m. The different plot lines represent values taken for different times during the simulated operational life (i.e. at 680 days of simulated operation, and at 1400 days, 2120 days, 2840 days, 3560 days, and (following a simulated shut-in) at 3602 days). Based on simulated results, the range of liquid level change over a 2 day shut-in may be on the order of 10% of the inter-well spacing distance.

At 835, a local shut-in subcool value is determined for each of the plurality of inflow zones. Preferably, the shut-in subcool value for an inflow zone is based on a local saturation temperature of an injection fluid at the measured shut-in pressure at that inflow zone, and the measured shut-in temperature at that inflow zone. For example, for a SAGD or SA-SAGD process, the local shut-in subcool value for an inflow zone may be defined as the difference between the saturation temperature $T_{sat}$ for steam at the local shut-in pressure $P_{res\_inflow}$ at that zone (i.e. $T_{sat}(P_{res\_inflow})$) and the local shut-in temperature $T_{res\_inflow}$ at that zone:

$$\text{Subcool}_{shut-in_i} = T_{sat}(P_{res\_inflow(shut-in)_i}) - T_{res\_inflow(shut-in)_i} \quad (4)$$

As discussed above, the local shut-in pressure in the reservoir adjacent the inflow location $P_{res\_inflow(shut-in)}$ may be assumed as being equal to a pressure value $P_{inflow}$ measured by a pressure sensor 230, or may be based on a measured pressure value $P_{inflow}$ subject to an adjustment factor (e.g. to compensate for a pressure drop across the reservoir/wellbore interface).

For a heated VAPEX (H-VAPEX) process, the local subcool value for an inflow zone may be defined as the difference between the saturation temperature $T_{sat}$ for the solvent being used at the local shut-in pressure $P_{res\_inflow}$ at that zone and the local shut-in temperature $T_{res\_inflow}$ at that zone.

At 840, a local profile value is determined for each of the plurality of inflow zones. The local profile value $S_T$ for each inflow zone is based on the local shut-in subcool value for that inflow zone and the local shut-in liquid level for that inflow zone:

$$S_{T_i} = \frac{\text{Subcool}_{shut-in_i}}{h_i} \quad (5)$$

Combining equations (4) and (5):

$$S_{T_i} = \frac{T_{sat}(P_{res\_inflow(shut-in)_i}) - T_{res\_inflow(shut-in)_i}}{h_i} \quad (6)$$

The local profile value $S_{T_i}$ can be characterized as the change in subcool required to move the liquid level by one meter (presuming the liquid level h is measured in meters, otherwise unit conversion would be required).

Figure 11:
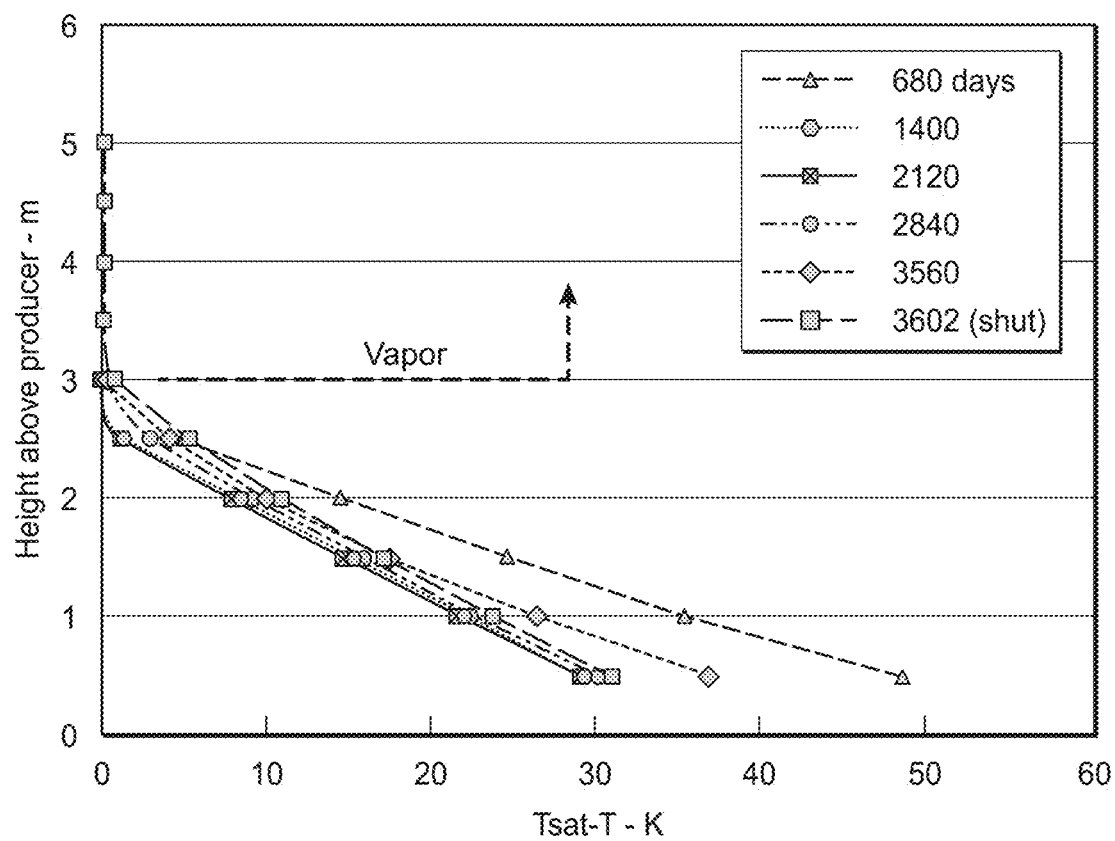
FIG. 11 is a plot of simulation results for local liquid level height as a function of local subcool during a simulated SAGD operation.

For example, FIG. 11 illustrates an example plot of local profile values $S_{T_i}$ from a simulated SAGD operation using injector and producer wellbores spaced 5 m apart, where the liquid level was being held at about 2.5 m. The different plot lines represent values taken for different times during the simulated operational life (i.e. at 680 days of simulated operation, and at 1400 days, 2120 days, 2840 days, 3560 days, and (following a simulated shut-in) at 3602 days). In this illustrative example, there is a generally linear relationship between local liquid level heights (y axis) and local subcool values (x-axis) for locations in the reservoir below the local liquid level. For locations in the reservoir above the local liquid level, the $T_{sat}$-T slope is approximately zero.

At 845, flow is resumed in the production wellbore and the injection wellbore. It will be appreciated that flow may be resumed prior to steps 830, 835, and/or 840, as these steps may be performed anytime using the measurements taken during shut-in.

At 850, a local operating temperature (i.e. a temperature measured during operating conditions after flow in the wellbores has resumed) for an inflow zone is measured using one or more temperature sensors distributed along the producer wellbore 200.

At 855, a local operating pressure (i.e. a pressure measured during operating conditions after flow in the wellbores has resumed) for the inflow zone is measured using one or more pressure sensors distributed along the producer wellbore 200.

At 860, a local operating subcool value is determined for the inflow zone. Like the shut-in subcool values determined at 835, the operating subcool value for an inflow zone is based on the measured operating temperature at that inflow zone. For example, for a SAGD or SA-SAGD process, the local operating subcool value for an inflow zone may be defined as the difference between the saturation temperature $T_{sat}$ for steam at the local operating pressure $P_{inflow}$ (or $P_{res\_inflow}$) at that zone (i.e. $T_{sat}(P_{inflow})$) and the local operating temperature $T_{inflow}$ (or $T_{res\_inflow}$) at that zone.

$$\text{Subcool}_{operating_i} = T_{sat}(P_{res\_inflow(operating)_i}) - T_{res\_inflow(operating)_i} \quad (7)$$

At 865, a local operating liquid level is determined for the inflow zone. The local operating liquid level may be determined by taking the difference between the local operating subcool value for the inflow zone and the local shut-in subcool value for the inflow zone (determined at 835). Next, this change in the local subcool value and the local profile value (determined at 840) can be used to determine a change in the local liquid level. This change in the local liquid level can be applied to the local shut-in liquid level for the inflow zone (determined at 830) to estimate the local operating liquid level. For example:

$$\text{Subcool}_{delta_i} = \text{Subcool}_{operating_i} - \text{Subcool}_{shut-in_i} \quad (8)$$

$$h_{delta_i} = \frac{\text{Subcool}_{delta_i}}{S_{T_i}} \quad (9)$$

$$h_{operating_i} = h_{delta_i} + h_{shut-in_i} \quad (10)$$

Alternatively, equations (10), (9), and (5) may be combined to express the local operating liquid level as a function of the local operating subcool value and the local profile value:

$$h_{operating_i} = \frac{Subcool_{operating_i}}{S_{T_i}} \quad (11)$$

Optionally, steps 810 to 840 may be performed each time the wellbores are shut-in (e.g. during scheduled service interruptions) to determine updated local liquid levels based on pressures measured during static flow conditions. An advantage of periodically re-determining the local shut-in liquid levels is that this may improve the accuracy of the liquid levels estimated during operation, as the re-determined baseline local liquid levels may be more accurate than local liquid levels estimated following a significant time period following the prior shut-in.

Additionally, or alternatively, steps 810 to 840 may be performed each time the wellbores are shut-in (e.g. during scheduled service interruptions) to determine updated local profile values. An advantage of periodically re-determining the profile values is that the relationship between a subcool change and a change in the local liquid level may 'drift' over time during the recovery process.

Figure 12:
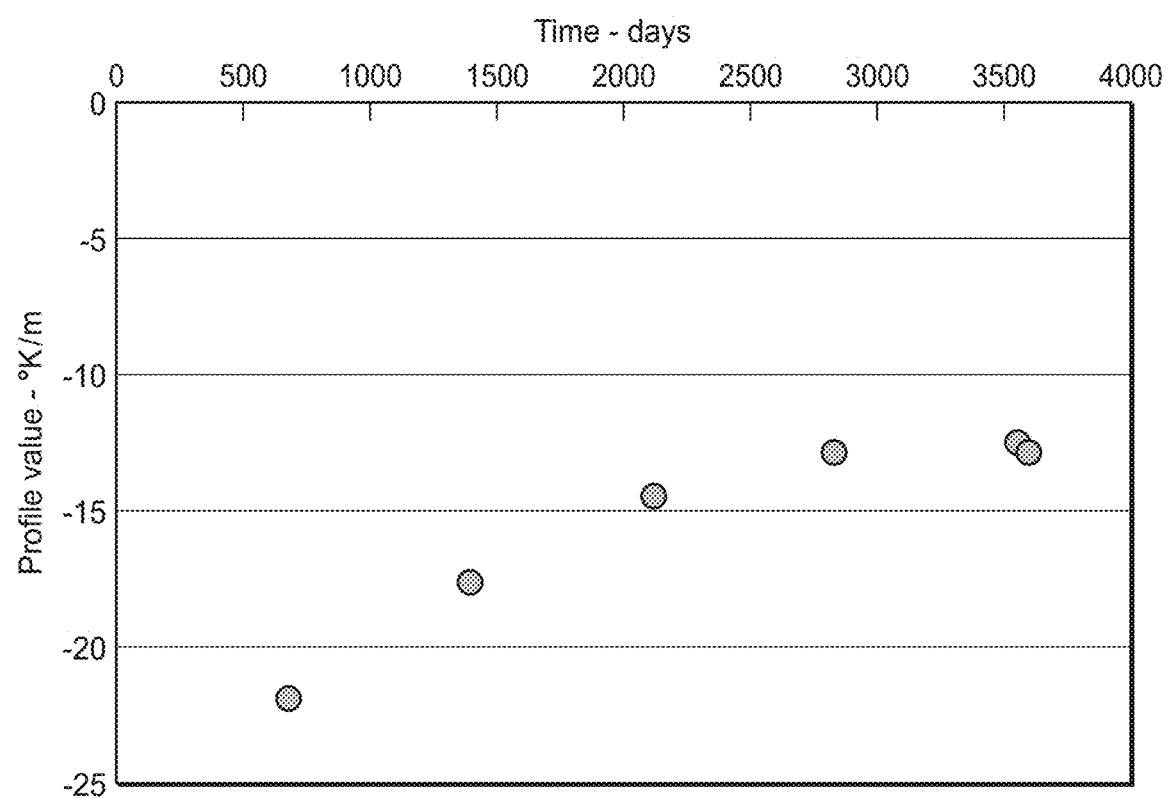
FIG. 12 is a plot of simulation results for a local profile value as a function of time during a simulated SAGD operation.

For example, FIG. 12 illustrates an example plot of a local profile value from a simulated SAGD operation using injector and producer wellbores spaced 5 m apart, where the liquid level was being held at about 2.5 m. In this example, the change in the local profile value (i.e. the slope of subcool/liquid level) (y-axis) as a function of operating time (x-axis) is generally monotonically increasing over the first 2,000 days or so, after which it may stabilize around a long-run value.

Preferably, after an updated local profile value is determined, the rate of 'drift' of the profile value (i.e. change in the local profile value as a function of operating time) may be estimated for the time period between the determination of the updated profile value and the prior profile value. This estimation of the 'drift' rate may be used as a factor during the liquid level determination at 865.

For example, the change in the local subcool value (i.e. the difference between the local operating subcool value for the inflow zone and the local shut-in subcool value for the inflow zone) may be scaled by an adjusted profile value (e.g. the local profile value determined at 840 scaled by the expected 'drift' rate for the time duration since the last shut-in) to determine a change in the local liquid level. This change in the local liquid level can then be applied to the local shut-in liquid level for the inflow zone (determined at 830) to estimate the local operating liquid level.

By determining (and preferably periodically updating) local profile values during shut-in conditions, local operating liquid levels for a number of locations distributed along the horizontal segment 106 of the injector wellbore may be determined using operating pressure and temperature data for these locations. This may allow for improved control of the liquid level between the injector and producer wellbores during a gravity drainage process (e.g. SAGD).

As discussed above, obtaining pressure and temperature data and determining local shut-in and operating state information for a number of locations distributed along the horizontal segments of the producer and/or injector wellbores may allow a more accurate and/or more detailed model to be developed for the production inflow and/or reservoir conditions along the wellbore. For such a model to allow for improved control of production during the SAGD process (e.g. by facilitating faster identification and/or responses to system changes), the local operating conditions are preferably updated in real-time or near-real time to provide current state information. Thus, one or more computing devices may be used to perform some or all of the calculations described herein. For example, it may be considered impractical (if not impossible) to determine and display, in a timely manner, an estimate of the liquid level h between the injector and producer at a number of locations along the wellbores without using one or more computing devices.

Also, updating such a model in real-time or near-real time to provide current state information may have one or more advantages. For example, such an updated model may facilitate improved steam conformance by adjusting heel/toe steam rates based on liquid level measurements.

For example, in response to determining that liquid levels are rising and/or above a target value, one or more actions may be taken promote the reduction of liquid levels. Non-limiting examples of such actions include: increasing the total flowrate for fluids exiting the wellbore segment (e.g. by increasing a pump rate of an artificial lift device); increasing an open area of at least one of the plurality of inflow locations, and; unblocking the open area of at least one of the plurality of inflow zones. During such actions, an injection rate may be raised to increase a total flow rate of fluids into the injector wellbore to maintain chamber pressure as the liquid level falls (e.g. the injection rate may be 'ramped up' temporarily, and then 'dialed back' to (approximately) the same rate once the liquid level has stabilized at a lower level), or the injection rate may be lowered, in order to decrease a total flow rate of fluids into the injector wellbore.

In response to determining that liquid levels are falling and/or below a target value, one or more actions may be taken promote an increase of liquid levels. Non-limiting examples of such actions include: decreasing the total flowrate for fluids exiting the wellbore segment (e.g. by decreasing a pump rate of an artificial lift device); decreasing an open area of at least one of the plurality of inflow locations, and; blocking the open area of at least one of the plurality of inflow zones. During such actions, an injection rate may be lowered to decrease a total flow rate of fluids into the injector wellbore to maintain chamber pressure as the liquid level rises (e.g. the injection rate may be 'dialed back' temporarily, and then 'ramped up' to (approximately) the same rate once the liquid level has stabilized at a higher level), or the injection rate may be raised, in order to increase a total flow rate of fluids into the injector wellbore.

It will be appreciated that other actions may be taken in response to high/rising or low/falling liquid levels. For example, in response to determining that liquid levels are rising and/or above a target value, an injection rate may be raised to increase a total flow rate of fluids into the injector wellbore, which may lead to lower or maintained liquid levels in the steam chamber, but only after a significant time delay. However, an increase in the injection rate may also result in an increase in the steam chamber temperature, which may increase the bitumen drainage rate in the steam chamber due to a reduction in bitumen viscosity. However, this impact may also have a significant time delay in that changes to the injection rate result in changes to the bitumen drainage rate at a time significantly delayed from the change in injection rate. Therefore, in embodiments herein, the control of the injection rate may have to be independently controlled (i.e., either increased or decreased) in any liquid level control situation, independent of the other liquid level control steps described herein.

Alternatively, or additionally, such an updated model may facilitate reducing gas vapor fractions in the producer, which in turn may reduce or preferably minimize pump failure and liner failures due to high velocity flows through the completions (e.g. possibly with sand moving with the high velocity fluid).

The various embodiments of the methods and systems described herein may be implemented using a combination of hardware and software. These embodiments may be implemented in part using computer programs executing on one or more programmable devices, each programmable device including at least one processor, an operating system, one or more data stores (including volatile memory or non-volatile memory or other data storage elements or a combination thereof), at least one communication interface and any other associated hardware and software that is necessary to implement the functionality of at least one of the embodiments described herein. For example, and without limitation, suitable computing devices may include one or more of a server, a network appliance, an embedded device, a personal computer, a laptop, a wireless device, or any other computing device capable of being configured to carry out some or all of the methods described herein.

In at least some of the embodiments described herein, program code may be applied to input data to perform at least some of the functions described herein and to generate output information. The output information may be applied to one or more output devices, for display or for further processing.

For example, a computer monitor or other display device may be configured to display a graphical representation of determined local liquid levels (under shut-in and/or operating conditions) for some or all of the inflow zones. In some embodiments, a schematic representation of the injector, producer, and formation (e.g. similar to FIGS. 2 to 7) may be displayed, along with a representation (e.g. a line, one or more line segments, or other symbols or indicia) of local liquid levels in the reservoir. For example, a representation of local liquid levels for all or some (e.g. 10%, 20%, or 50%) of the length between the heel and the toe of the wellbore segment may be displayed.

At least some of the embodiments described herein that use programs may be implemented in a high level procedural or object oriented programming and/or scripting language or both. Accordingly, the program code may be written in C, Java, SQL or any other suitable programming language and may comprise modules or classes, as is known to those skilled in object oriented programming. However, other programs may be implemented in assembly, machine language or firmware as needed. In either case, the language may be a compiled or interpreted language.

The computer programs may be stored on a storage media (e.g. a computer readable medium such as, but not limited to, ROM, magnetic disk, optical disc) or a device that is readable by a general or special purpose computing device. The program code, when read by the computing device, configures the computing device to operate in a new, specific, and predefined manner in order to perform at least one of the methods described herein.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

EMBODIMENTS

Embodiment 1

A method for determining a liquid level in a formation between a horizontal segment of an injection wellbore and a horizontal segment of a production wellbore, the method comprising:
  shutting-in the production wellbore;
  shutting-in the injection wellbore;
  measuring, using at least one first temperature sensor positioned in the production wellbore segment, a local shut-in temperature for each of a plurality of inflow zones between a heel and a toe of the production wellbore segment;
  measuring, using at least one first pressure sensor positioned in the production wellbore segment, a local shut-in pressure for each of the plurality of inflow zones;
  determining, for each of the plurality of inflow zones:
    a local shut-in liquid level, based on the measured shut-in pressure at that inflow zone and a shut-in pressure for an injection zone horizontally aligned with that inflow zone;
    a local shut-in subcool value, based on the measured shut-in temperature at that inflow zone; and
    a local profile value, based on the local shut-in subcool value for that inflow zone and the local shut-in liquid level for that inflow zone;
  resuming flow in the production wellbore;
  resuming flow in the injection wellbore;
  after resuming flow in the production and injection wellbores, for at least one of the plurality of inflow zones:
    measuring, using the at least one first temperature sensor positioned in the production wellbore, a local operating temperature for that inflow zone;
    determining a local operating subcool value, based on the measured operating temperature at that inflow zone;
    determining a local operating liquid level, based on the local operating subcool value for that inflow zone and the local profile value for that inflow zone.

Embodiment 2

The method of embodiment 1, wherein a local operating liquid level is determined for each of the plurality of inflow zones.

Embodiment 3

The method of embodiment 1 or embodiment 2, wherein the determined local shut-in subcool value is based on a local saturation temperature of an injection fluid at the measured shut-in pressure at that inflow zone and the measured shut-in temperature at that inflow zone.

Embodiment 4

The method of any one of embodiments 1 to 3, further comprising, after resuming flow in the production and injection wellbores, measuring, using the at least one first pressure sensor, a local operating pressure for that inflow zone, and wherein the determined local operating subcool value is based on a local saturation temperature of the injection fluid at the measured operating pressure at that inflow zone and the measured operating temperature at that inflow zone.

Embodiment 5

The method of any one of embodiments 1 to 4, wherein the determined local operating liquid level is based on the local shut-in liquid level for that inflow zone, a difference between the local operating subcool value for that inflow zone and the local shut-in subcool value for that inflow zone, and the local profile value for that inflow zone.

Embodiment 6

The method of any one of embodiments 1 to 5, wherein the local shut-in temperature for each of the plurality of injection zones is obtained using at least one second temperature sensor positioned in the injection wellbore.

Embodiment 7

The method of any one of embodiments 1 to 6, wherein the local shut-in pressure for each of the plurality of injection zones is obtained using at least one second pressure sensor positioned in the injection wellbore.

Embodiment 8

The method of any one of embodiments 1 to 7, further comprising:
    after determining the local operating liquid level for the at least one of the plurality of inflow zones:
        comparing the determined local operating liquid level for the at least one of the plurality of inflow zones to a target liquid level;
        in response to the determined local operating liquid level for the at least one of the plurality of inflow zones being greater than the target liquid level, performing at least one of:
            increasing a pump rate of an artificial lift device to increase the total flowrate for fluids exiting the production wellbore segment;
            increasing an open area of at least one of the plurality of inflow zones; and
            unblocking the open area of at least one of the plurality of inflow zones; and
        in response to the target liquid level being greater than the determined local operating liquid level for the at least one of the plurality of production zones, performing at least one of:
            decreasing the pump rate of the artificial lift device to decrease the total flowrate for fluids exiting the production wellbore segment;
            decreasing the open area of at least one of the plurality of inflow zones; and
            blocking the open area of at least one of the plurality of inflow zones.

Embodiment 9

The method of embodiment 8, wherein, in response to the determined local operating liquid level for at least one of the plurality of inflow zones being greater than the target liquid level, the method further comprises increasing an injection rate of a fluid injector to increase a total flow rate of fluids into the injector wellbore, in order to maintain pressure in a steam chamber.

Embodiment 10

The method of embodiment 8, wherein, in response to the determined local operating liquid level for at least one of the plurality of inflow zones being greater than the target liquid level, the method further comprises decreasing an injection rate of a fluid injector to decrease a total flow rate of fluids into the injector wellbore, in order to decrease a bitumen drainage rate in a steam chamber.

Embodiment 11

The method of embodiment 8, wherein, in response to the target liquid level being greater than the determined local operating liquid level for at least one of the plurality of inflow zones, the method further comprises decreasing an injection rate of a fluid injector to decrease a total flow rate of fluids into the injector wellbore, in order to maintain pressure in a steam chamber.

Embodiment 12

The method of embodiment 8, wherein, in response to the target liquid level being greater than the determined local operating liquid level for at least one of the plurality of inflow zones, the method further comprises increasing an injection rate of a fluid injector to increase a total flow rate of fluids into the injector wellbore, in order to increase a bitumen drainage rate in a steam chamber.

Embodiment 13

The method of any one of embodiments 1 to 12, further comprising, after determining the local operating liquid level for the at least one of the plurality of inflow zones:
    shutting-in the production and injection wellbores a second time;
    determining updated local profile values for each of the plurality of inflow zones;
    resuming flow in the production and injection wellbores a second time;
    after resuming flow in the production and injection wellbores the second time, for at least one of the plurality of inflow zones:
        determining an updated local operating liquid level, based on an updated local shut-in liquid level for that inflow zone, a difference between an updated local operating subcool value for that inflow zone and an updated local shut-in subcool value for that inflow zone, and the updated local profile value for that inflow zone.

Embodiment 14

The method of any one of embodiments 1 to 12, further comprising:

after determining the local profile values during a first shut-in period:
  determining updated local profile values during a second shut-in period;
  determining, for at least one of the plurality of inflow zones, a profile adjustment factor based on the local profile value for that inflow zone, the updated local profile value for that inflow zone, and a duration between the first and second shut-in periods; and
after resuming flow in the production and injection wellbores following the second shut-in period, for at least one of the plurality of inflow zones:
  determining a local operating liquid level, based on the local shut-in liquid level for that inflow zone, a difference between the local operating subcool value for that inflow zone and the local shut-in subcool value for that inflow zone, the updated local profile value for that inflow zone, the local profile adjustment factor for that inflow zone, and a duration between the second shut-in period and a period during which the local operating temperature and pressure were measured when determining the subcool value for that inflow zone.

Embodiment 15

The method of any one of embodiments 1 to 14, further comprising:
  after shutting in the injection wellbore, and before determining the local shut-in liquid levels:
    performing a gas purge of the injector wellbore.

Embodiment 16

A system for determining a liquid level in a formation between a horizontal segment of an injection wellbore and a horizontal segment of a production wellbore, the system comprising:
  at least one first temperature sensor positioned in the production wellbore segment to measure a local temperature for each of a plurality of inflow zones between a heel and a toe of the production wellbore segment;
  at least one first pressure sensor positioned in the production wellbore segment to measure a local pressure for each of the plurality of inflow zones;
  one or more processors operatively coupled to the at least one first temperature sensor and the at least one first pressure sensor, the one or more processors, collectively, configured to:
    during a period in which the production wellbore and the injection wellbore are shut-in:
      determine, for each of the plurality of inflow zones:
        a local shut-in liquid level, based on a measured shut-in pressure at that inflow zone and a shut-in pressure for an injection zone horizontally aligned with that inflow zone;
        a local shut-in subcool value, based on a measured shut-in temperature at that inflow zone; and
        a local profile value, based on the local shut-in subcool value for that inflow zone and the local shut-in liquid level for that inflow zone; and
      after resuming flow in the production and injection wellbores:
        determine, for at least one of the plurality of inflow zones:
          a local operating subcool value, based on a measured operating temperature at that inflow zone; and
          a local operating liquid level, based on the local operating subcool value for that inflow zone and the local profile value for that inflow zone.

Embodiment 17

The system of embodiment 16, wherein the one or more processors are configured to determine the local shut-in subcool value for each of the plurality of inflow zones based on the measured shut-in temperature at that inflow zone and a local saturation temperature of an injection fluid at the measured shut-in pressure at that inflow zone.

Embodiment 18

The system of embodiment 16 or embodiment 17, wherein the one or more processors are configured to determine the local operating subcool value for the at least one of the plurality of inflow zones based on the measured operating temperature at that inflow zone and a local saturation temperature of the injection fluid at a measured operating pressure at that inflow zone.

Embodiment 19

The system of any one of embodiments 16 to 18, wherein the one or more processors are configured to determine the local operating liquid level based on the local shut-in liquid level for that inflow zone, a difference between the local operating subcool value for that inflow zone and the local shut-in subcool value for that inflow zone, and the local profile value for that inflow zone.

Embodiment 20

The system of any one of embodiments 16 to 19, wherein the at least one first temperature sensor comprises a thermocouple or a set of thermocouples.

Embodiment 21

The system of any one of embodiments 16 to 19, wherein the at least one first temperature sensor comprises a distributed temperature sensor (DTS).

Embodiment 22

The system of embodiment 20 or embodiment 21, further comprising at least one second temperature sensor positioned in the injection wellbore to measure a local temperature for each of a plurality of injection zones between a heel and a toe of the injection wellbore segment.

Embodiment 23

The system of any one of embodiments 16 to 22, wherein the at least one first pressure sensor comprises a distributed pressure sensing system.

Embodiment 24

The system of any one of embodiments 16 to 23, wherein the at least one first pressure sensor is positioned exterior of a production string located in the production wellbore segment.

Embodiment 25

The system of any one of embodiments 16 to 24, wherein the at least one first pressure sensor comprises fewer discrete pressure sensors than the number of inflow zones in the plurality of inflow zones, and wherein, for inflow zones without a discrete pressure sensor positioned therein, the one or more processors are configured to determine local pressures for those inflow zones using a model based on pressures from discrete pressure sensors positioned in other inflow zones.

Embodiment 26

The system of any one of embodiments 16 to 25, further comprising at least one second pressure sensor positioned in the injection wellbore to measure a local pressure for each of the plurality of injection zones.

Embodiment 27

The system of embodiment 26, wherein the at least one second pressure sensor comprises fewer discrete pressure sensors than the number of injection zones in the plurality of injection zones, and wherein, for injection zones without a discrete pressure sensor positioned therein, the one or more processors are configured to determine local pressures for those injection zones using a model based on pressures from discrete pressure sensors positioned in other injection zones.

Embodiment 28

The system of any one of embodiments 16 to 27, wherein the plurality of inflow zones comprises at least five inflow zones.

Embodiment 29

The system of any one of embodiments 16 to 28, further comprising a display device operatively coupled to the one or more processors, and wherein the one or more processors are further configured to cause the display device to display a graphical representation of the determined local operating liquid levels for the at least one of the plurality of inflow zones.

Embodiment 30

The system of embodiment 29, wherein the graphical representation of the determined local operating liquid levels for the at least one of the plurality of inflow zones comprises a representation of local operating liquid levels for at least ten percent of a length between the heel and the toe of the production wellbore segment.

The invention claimed is:

1. A method for determining a liquid level in a formation between a horizontal segment of an injection wellbore and a horizontal segment of a production wellbore, the method comprising:
   shutting-in the production wellbore;
   shutting-in the injection wellbore;
   measuring, using at least one first temperature sensor positioned in the production wellbore segment, a local shut-in temperature for each of a plurality of inflow zones between a heel and a toe of the production wellbore segment;
   measuring, using at least one first pressure sensor positioned in the production wellbore segment, a local shut-in pressure for each of the plurality of inflow zones;
   determining, for each of the plurality of inflow zones:
     a local shut-in liquid level, based on the measured shut-in pressure at that inflow zone and a shut-in pressure for an injection zone horizontally aligned with that inflow zone;
     a local shut-in subcool value, based on the measured shut-in temperature at that inflow zone; and
     a local profile value, based on the local shut-in subcool value for that inflow zone and the local shut-in liquid level for that inflow zone, the local profile value being a relationship between a change of the local shut-in subcool value and a change of the local shut-in liquid level;
   resuming flow in the production wellbore;
   resuming flow in the injection wellbore;
   after resuming flow in the production and injection wellbores, for at least one of the plurality of inflow zones:
     measuring, using the at least one first temperature sensor positioned in the production wellbore, a local operating temperature for that inflow zone;
     determining a local operating subcool value, based on the measured operating temperature at that inflow zone;
     determining a local operating liquid level, based on the local operating subcool value for that inflow zone and the local profile value for that inflow zone.

2. The method of claim 1, wherein a local operating liquid level is determined for each of the plurality of inflow zones.

3. The method of claim 1, wherein the determined local shut-in subcool value is based on a local saturation temperature of an injection fluid at the measured shut-in pressure at that inflow zone and the measured shut-in temperature at that inflow zone.

4. The method of claim 1, further comprising, after resuming flow in the production and injection wellbores, measuring, using the at least one first pressure sensor, a local operating pressure for that inflow zone, and wherein the determined local operating subcool value is based on a local saturation temperature of the injection fluid at the measured operating pressure at that inflow zone and the measured operating temperature at that inflow zone.

5. The method of claim 1, wherein the determined local operating liquid level is based on the local shut-in liquid level for that inflow zone, a difference between the local operating subcool value for that inflow zone and the local shut-in subcool value for that inflow zone, and the local profile value for that inflow zone.

6. The method of claim 1, wherein the local shut-in temperature for each of the plurality of injection zones is obtained using at least one second temperature sensor positioned in the injection wellbore.

7. The method of claim 1, wherein the local shut-in pressure for each of the plurality of injection zones is obtained using at least one second pressure sensor positioned in the injection wellbore.

8. The method of claim 1, further comprising:
   after determining the local operating liquid level for the at least one of the plurality of inflow zones:
     comparing the determined local operating liquid level for the at least one of the plurality of inflow zones to a target liquid level;
     in response to the determined local operating liquid level for the at least one of the plurality of inflow zones being greater than the target liquid level, performing at least one of:
  increasing a pump rate of an artificial lift device to increase the total flowrate for fluids exiting the production wellbore segment;
  increasing an open area of at least one of the plurality of inflow zones; and
  unblocking the open area of at least one of the plurality of inflow zones; and
in response to the target liquid level being greater than the determined local operating liquid level for the at least one of the plurality of production zones, performing at least one of:
  decreasing the pump rate of the artificial lift device to decrease the total flowrate for fluids exiting the production wellbore segment;
  decreasing the open area of at least one of the plurality of inflow zones; and
  blocking the open area of at least one of the plurality of inflow zones.

9. The method of claim 8, wherein, in response to the determined local operating liquid level for at least one of the plurality of inflow zones being greater than the target liquid level, the method further comprises increasing an injection rate of a fluid injector to increase a total flow rate of fluids into the injector wellbore, in order to maintain pressure in a steam chamber.

10. The method of claim 8, wherein, in response to the determined local operating liquid level for at least one of the plurality of inflow zones being greater than the target liquid level, the method further comprises decreasing an injection rate of a fluid injector to decrease a total flow rate of fluids into the injector wellbore, in order to decrease a bitumen drainage rate in a steam chamber.

11. The method of claim 8, wherein, in response to the target liquid level being greater than the determined local operating liquid level for at least one of the plurality of inflow zones, the method further comprises decreasing an injection rate of a fluid injector to decrease a total flow rate of fluids into the injector wellbore, in order to maintain pressure in a steam chamber.

12. The method of claim 8, wherein, in response to the target liquid level being greater than the determined local operating liquid level for at least one of the plurality of inflow zones, the method further comprises increasing an injection rate of a fluid injector to increase a total flow rate of fluids into the injector wellbore, in order to increase a bitumen drainage rate in a steam chamber.

13. The method of claim 1, further comprising, after determining the local operating liquid level for the at least one of the plurality of inflow zones:
  shutting-in the production and injection wellbores a second time;
  determining updated local profile values for each of the plurality of inflow zones;
  resuming flow in the production and injection wellbores a second time;
  after resuming flow in the production and injection wellbores the second time, for at least one of the plurality of inflow zones:
    determining an updated local operating liquid level, based on an updated local shut-in liquid level for that inflow zone, a difference between an updated local operating subcool value for that inflow zone and an updated local shut-in subcool value for that inflow zone, and the updated local profile value for that inflow zone.

14. The method of claim 1, further comprising:
after determining the local profile values during a first shut-in period:
  determining updated profile values during a second shut-in period;
  determining, for at least one of the plurality of inflow zones, a profile adjustment factor based on the local profile value for that inflow zone, the updated local profile value for that inflow zone, and a duration between the first and second shut-in periods; and
after resuming flow in the production and injection wellbores following the second shut-in period, for at least one of the plurality of inflow zones:
  determining a local operating liquid level, based on the local shut-in liquid level for that inflow zone, a difference between the local operating subcool value for that inflow zone and the local shut-in subcool value for that inflow zone, the updated profile value for that inflow zone, the profile adjustment factor for that inflow zone, and a duration between the second shut-in period and a period during which the local operating temperature and pressure were measured when determining the subcool value for that inflow zone.

15. The method of claim 1, further comprising:
after shutting in the injection wellbore, and before determining the local shut-in liquid levels:
  performing a gas purge of the injector wellbore.

16. A system for determining a liquid level in a formation between a horizontal segment of an injection wellbore and a horizontal segment of a production wellbore, the system comprising:
at least one first temperature sensor positioned in the production wellbore segment to measure a local temperature for each of a plurality of inflow zones between a heel and a toe of the production wellbore segment;
at least one first pressure sensor positioned in the production wellbore segment to measure a local pressure for each of the plurality of inflow zones;
one or more processors operatively coupled to the at least one first temperature sensor and the at least one first pressure sensor, the one or more processors, collectively, configured to:
  during a period in which the production wellbore and the injection wellbore are shut-in:
    determine, for each of the plurality of inflow zones:
      a local shut-in liquid level, based on a measured shut-in pressure at that inflow zone and a shut-in pressure for an injection zone horizontally aligned with that inflow zone;
      a local shut-in subcool value, based on a measured shut-in temperature at that inflow zone; and
      a local profile value, based on the local shut-in subcool value for that inflow zone and the local shut-in liquid level for that inflow zone, the local profile value being a relationship between a change of the local shut-in subcool value and a change of the local shut-in liquid level; and
  after resuming flow in the production and injection wellbores:
    determine, for at least one of the plurality of inflow zones:
      a local operating subcool value, based on a measured operating temperature at that inflow zone; and a local operating liquid level, based on the local operating subcool value for that inflow zone and the local profile value for that inflow zone.

17. The system of claim 16, wherein the one or more processors are configured to determine the local shut-in subcool value for each of the plurality of inflow zones based on the measured shut-in temperature at that inflow zone and a local saturation temperature of an injection fluid at the measured shut-in pressure at that inflow zone.

18. The system of claim 16, wherein the one or more processors are configured to determine the local operating subcool value for the at least one of the plurality of inflow zones based on the measured operating temperature at that inflow zone and a local saturation temperature of the injection fluid at a measured operating pressure at that inflow zone.

19. The system of claim 16, wherein the one or more processors are configured to determine the local operating liquid level based on the local shut-in liquid level for that inflow zone, a difference between the local operating subcool value for that inflow zone and the local shut-in subcool value for that inflow zone, and the local profile value for that inflow zone.

20. The system of claim 16, wherein the at least one first temperature sensor comprises at least one of a distributed temperature sensor (DTS) and a thermocouple or a set of thermocouples.

21. The system of claim 16, further comprising at least one second temperature sensor positioned in the injection wellbore to measure a local temperature for each of a plurality of injection zones between a heel and a toe of the injection wellbore segment.

22. The system of claim 16, wherein the at least one first pressure sensor comprises a distributed pressure sensing system.

23. The system of claim 16, wherein the at least one first pressure sensor is positioned exterior of a production string located in the production wellbore segment.

24. The system of claim 16, wherein the at least one first pressure sensor comprises fewer discrete pressure sensors than the number of inflow zones in the plurality of inflow zones, and wherein, for inflow zones without a discrete pressure sensor positioned therein, the one or more processors are configured to determine local pressures for those inflow zones using a model based on pressures from discrete pressure sensors positioned in other inflow zones.

25. The system of claim 16, further comprising at least one second pressure sensor positioned in the injection wellbore to measure a local pressure for each of the plurality of injection zones.

26. The system of claim 24, wherein the at least one second pressure sensor comprises fewer discrete pressure sensors than the number of injection zones in the plurality of injection zones, and wherein, for injection zones without a discrete pressure sensor positioned therein, the one or more processors are configured to determine local pressures for those injection zones using a model based on pressures from discrete pressure sensors positioned in other injection zones.

27. The system of claim 16, wherein the plurality of inflow zones comprises at least five inflow zones.

28. The system of claim 16, further comprising a display device operatively coupled to the one or more processors, and wherein the one or more processors are further configured to cause the display device to display a graphical representation of the determined local operating liquid levels for the at least one of the plurality of inflow zones.

* * * * *